United States Patent
Aou et al.

(10) Patent No.: US 11,659,938 B2
(45) Date of Patent: May 30, 2023

(54) COATED OPEN-CELL POLYURETHANE FOAM STRUCTURES WITH THERMAL ABSORPTION CAPABILITIES

(71) Applicant: Dow Global Technologies LLC, Midland, MI (US)

(72) Inventors: Kaoru Aou, Lake Jackson, TX (US); Wenbo Xu, Sugar Land, TX (US); Yibei Gu, Redwood, CA (US); Douglas A. Brune, Midland, MI (US); Laura J. Dietsche, Midland, MI (US); Marc S. Black, Midland, MI (US)

(73) Assignee: Dow Global Technologies, LLC, Midland, MI (US)

( * ) Notice: Subject to any disclaimer, the term of this patent is extended or adjusted under 35 U.S.C. 154(b) by 0 days.

(21) Appl. No.: 17/266,293

(22) PCT Filed: Aug. 21, 2019

(86) PCT No.: PCT/US2019/047496
§ 371 (c)(1),
(2) Date: Feb. 5, 2021

(87) PCT Pub. No.: WO2020/041464
PCT Pub. Date: Feb. 27, 2020

(65) Prior Publication Data
US 2021/0267382 A1    Sep. 2, 2021

Related U.S. Application Data

(60) Provisional application No. 62/720,409, filed on Aug. 21, 2018.

(51) Int. Cl.
*A47C 27/15*    (2006.01)
*A47C 21/04*    (2006.01)
(Continued)

(52) U.S. Cl.
CPC ............ *A47C 27/15* (2013.01); *A47C 21/046* (2013.01); *A47C 27/002* (2013.01);
(Continued)

(58) Field of Classification Search
CPC ................ B32B 5/18; B32B 2255/102; B32B 2266/0278; B32B 2266/06;
(Continued)

(56) References Cited

U.S. PATENT DOCUMENTS 5,397,613 A    3/1995    Georgelos
5,562,958 A    10/1996    Walton et al.
(Continued)

FOREIGN PATENT DOCUMENTS

EP    865462    9/1998
EP    2801464    11/2014
(Continued)

OTHER PUBLICATIONS

International Search Report & Written Opinion for related PCT Application PCT/US2019/047496, dated Oct. 9, 2019 (11 pgs).
International Preliminary Report on Patentability for related PCT Application PCT/US2019/047496, dated Mar. 4, 2021 (7 pgs).

*Primary Examiner* — Hai Vo
(74) *Attorney, Agent, or Firm* — Brooks, Cameron & Huebsch, PLLC

(57) ABSTRACT

The present disclosure provides for a coated flexible open-cell polyurethane foam structure. The coated flexible open-cell polyurethane foam structure includes a flexible open-cell polyurethane foam having a first major surface and a second major surface opposite the first major surface. The coated flexible open-cell polyurethane foam structure further includes a flexible heat conductive material covering 30 to 90 percent (cov., expressed in %) of a surface area of the first major surface of the flexible open-cell polyurethane
(Continued)

foam in a predefined shape to provide one or more gaps exposing the flexible open-cell polyurethane foam between defined edges of the flexible heat conductive material, where each gap of the one or more gaps has a gap width according to Formula I: gap width (mm)≤−0.196×cov. (%)+20.6 (Formula I) where a total surface area of the one or more gaps provides 70 to 10 percent of the surface area of the first major surface of the flexible open-cell polyurethane foam.

14 Claims, 10 Drawing Sheets

(51) Int. Cl.
  *A47C 27/00*  (2006.01)
  *A47G 9/10*  (2006.01)
  *B32B 5/18*  (2006.01)
  *B32B 5/32*  (2006.01)
  *C09D 133/08*  (2006.01)
  *C09D 171/02*  (2006.01)

(52) U.S. Cl.
  CPC ............ *A47G 9/1036* (2013.01); *B32B 5/18* (2013.01); *B32B 5/32* (2013.01); *C09D 133/08* (2013.01); *C09D 171/02* (2013.01); *A47G 2009/1018* (2013.01); *B32B 2255/102* (2013.01); *B32B 2255/205* (2013.01); *B32B 2266/0278* (2013.01); *B32B 2266/06* (2013.01); *B32B 2307/302* (2013.01)

(58) Field of Classification Search
  CPC ............ B32B 2307/302; C09D 133/08; C09D 171/02; A47C 27/15; A47C 27/14
  See application file for complete search history.

(56) References Cited

U.S. PATENT DOCUMENTS

| | | | |
|---|---|---|---|
| 8,434,748 B1 | 5/2013 | Pearce et al. | |
| 9,339,117 B1 | 5/2016 | Limer et al. | |
| 2007/0246157 A1* | 10/2007 | Mason ................ | A47C 27/085 156/242 |
| 2012/0244312 A1* | 9/2012 | Pearce ................ | D06N 7/0092 428/136 |
| 2014/0039082 A1 | 2/2014 | Peterson et al. | |
| 2015/0040327 A1 | 2/2015 | Mikkelsen | |
| 2015/0067967 A1 | 3/2015 | Tyree | |
| 2016/0059510 A1 | 3/2016 | Brunner et al. | |
| 2016/0286972 A1 | 10/2016 | Defranks et al. | |
| 2017/0037215 A1 | 2/2017 | Crawford et al. | |
| 2019/0211171 A1 | 7/2019 | Aou et al. | |

FOREIGN PATENT DOCUMENTS

| | | |
|---|---|---|
| WO | 97/21766 | 6/1997 |
| WO | 02093644 A2 | 11/2002 |
| WO | 2018023139 | 2/2018 |

* cited by examiner

COATED OPEN-CELL POLYURETHANE FOAM STRUCTURES WITH THERMAL ABSORPTION CAPABILITIES

This application is a National Stage Application under 35 U.S.C. § 371 of International Application Number PCT/US2019/047496, filed Aug. 21, 2019 and published as WO 2020/041464 on Feb. 27, 2020, which claims the benefit to U.S. Provisional Application 62/720,409, filed Aug. 21, 2018, the entire contents of which are incorporated herein by reference in its entirety

TECHNICAL FIELD

The present disclosure relates generally to open-cell polyurethane foam structures and more specifically to coated open-cell polyurethane foam structures with thermal absorption capabilities.

BACKGROUND

Flexible, viscoelastic polyurethane foam (also known as slow-recovery foam, memory foam, and high-damping foam) is characterized by relatively slow, gradual recovery from compression and the viscoelastic foam may have a relatively lower resiliency. Exemplary applications for viscoelastic foam utilize the foam's characteristics such as shape conforming, energy attenuating, and/or sound damping. For example, the viscoelastic polyurethane foam may be used in comfort applications (such as bedding and pillows), shock absorbing applications (such as in athletic padding and helmets), noise and/or vibration dampening applications (such as earplugs, automobile panels, etc.) and filtration applications (such as vacuum air filters, gutter guards for protecting rain gutter/rain catcher against debris such as plant leaves and melting snow).

Coatings for foams, such as viscoelastic foams, are proposed to minimize, reduce, and/or avoid issues as related to warm sleep (also called "sleeping hot" or "hot sleep") that may result, in part, from a lack of sufficient thermal and/or moisture transfer from the human body to the environment. For example, warm sleep may be, in part, resulting from a blanket on top of the human body and/or from the mattress underneath the human body. Solid polymer gel layers coated or laminated (either in the mold or during post-fabrication steps) on polyurethane based foam pillows have been suggested to help mitigate these issues, e.g., due to the greater solid mass and contact area ("heat sink effect") such gel layers may provide compared with the foam itself (which foam may be mostly air). The non-breathable nature of a solid polymer gel is not seen as a problem for pillows, since the human head is not usually covered by a blanket during sleep, leaving the human head exposed to the room air for extra cooling. However, for mattress materials, where blankets cover the human body during use, it is thought that the non-breathable nature of solid polymer gels leads to a disadvantage (such as warm sleep, elevated moisture levels near the body that leads to discomfort, etc.) that is not overcome by the "heat sink effect." So, there is a need in the art to overcome these disadvantages present in the prior art.

SUMMARY

The present disclosure provides for a coated flexible open-cell polyurethane foam structure with thermal absorption capabilities that may help to overcome the disadvantages present in the prior art. The coated flexible open-cell polyurethane foam structure includes a flexible open-cell polyurethane foam having a first major surface and a second major surface opposite the first major surface. The coated flexible open-cell polyurethane foam structure further includes a flexible heat conductive material covering 30 to 90 percent ("cov.", expressed in %) of a surface area of the first major surface of the flexible open-cell polyurethane foam in a predefined shape to provide one or more gaps exposing the flexible open-cell polyurethane foam between defined edges of the flexible heat conductive material, where each of the one or more gaps has a gap width according to Formula I:

$$\text{gap width(mm)} \leq -0.196 \times \text{cov. (\%)} + 20.6 \qquad \text{(Formula I)}$$

where a total surface area of the one or more gaps provides 70 to 10 percent of the surface area of the first major surface of the flexible open-cell polyurethane foam. For the various embodiments, the flexible open-cell polyurethane foam is a viscoelastic polyurethane foam.

For the various embodiments provided herein, the flexible heat conductive material contains an encapsulated phase change material. For the various embodiments, the encapsulated phase change material has a latent heat of transition of 80 to 300 joules per gram of the flexible heat conductive material. In additional embodiments, the flexible heat conductive material is a gel. In other embodiments, the flexible heat conductive material is a metal. For the various embodiments, the flexible heat conductive material can be encapsulated in a polymeric membrane.

The flexible heat conductive material in the predefined shape can have a thickness of 0.1 to 2 millimeter. The predefined shape of the flexible heat conductive material can include a single continuous strip on the first major surface of the open-cell viscoelastic polyurethane foam. In one embodiment, the single continuous strip on the first major surface of the flexible open-cell polyurethane foam has a serpentine shape. In an alternative embodiment, the predefined shape of the flexible heat conductive material is a series of parallel strips on the first major surface of the flexible open-cell polyurethane foam.

For the various embodiments, the gap width for each of the one or more gaps has the same value. In an alternative embodiment, the gap width for each of the one or more gaps has a different value. Each value for the gap width provided herein is determined using the equation of Formula I.

Embodiments of the coated flexible open-cell polyurethane foam structure include structures in which at least a portion of the flexible heat conductive material forms an outer surface of the coated flexible open-cell polyurethane foam that is co-planar with the first major surface of the flexible open-cell polyurethane foam. In an additional embodiment, at least a portion of the flexible open-cell polyurethane foam completely covers the flexible heat conductive material.

DETAILED DESCRIPTION

Figure 1:
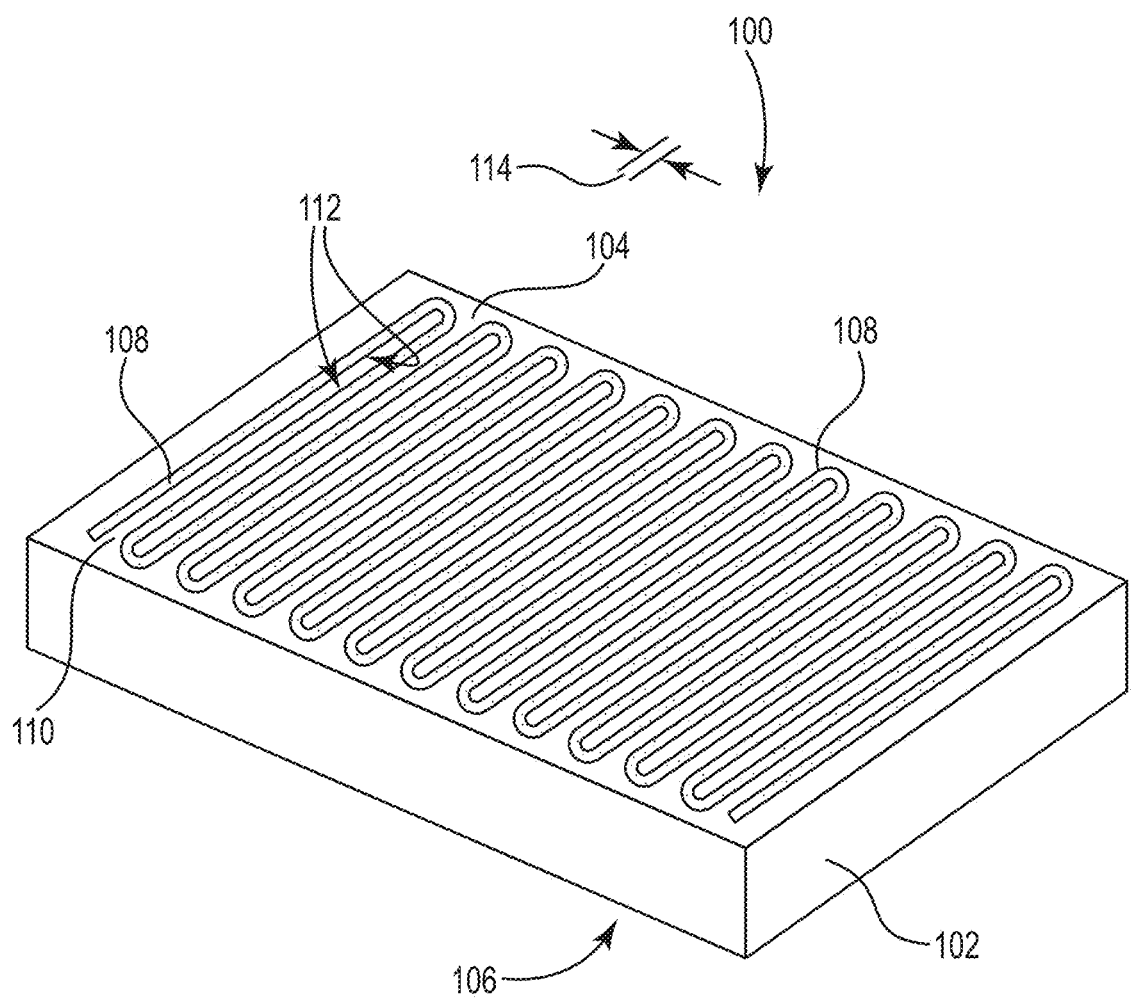
FIG. 1 is an embodiment of the coated flexible open-cell polyurethane foam structure of the present disclosure.

The present disclosure provides for a coated flexible open-cell polyurethane foam structure with thermal absorption capabilities that may help to overcome the disadvantages present in the prior art. The coated flexible open-cell polyurethane foam structure of the present disclosure includes a flexible open-cell polyurethane foam and a flexible heat conductive material that covers a predefined percentage of the surface area of a first major surfaces of the coated flexible open-cell polyurethane foam structure. Unlike other coatings, however, the flexible heat conductive material of the present disclosure has a predefined shape to provide one or more gaps that expose the flexible open-cell polyurethane foam between defined edges of the flexible heat conductive material. The width of each of the gaps of the one or more gaps is determined by a very specific formula, provided herein, that allows for a balance of both heat and moisture transfer from the coated flexible open-cell polyurethane foam structure that helps to both cool and maintain moisture levels at the skin surface of the person interacting with the coated flexible open-cell polyurethane foam structure.

As used herein, "a," "an," "the," "at least one," and "one or more" are used interchangeably. The term "and/or" means one, one or more, or all of the listed items. The recitations of numerical ranges by endpoints include all numbers subsumed within that range (e.g., 1 to 5 includes 1, 1.5, 2, 2.75, 3, 3.80, 4, 5, etc.). The figures herein follow a numbering convention in which the first digit or digits correspond to the drawing figure number and the remaining digits identify an element in the drawing. Similar elements between different figures may be identified by the use of similar digits. For example, 354 may reference element "54" in FIG. 3, and a similar element may be referenced as 454 in FIG. 4. It is emphasized that the purpose of the figures is to illustrate, and the figures are not intended to be limiting in any way. The figures herein may not be to scale and relationships of elements in the figures may be exaggerated. The figures are employed to illustrate conceptual structures and methods herein described.

For the various embodiments, the coated flexible open-cell polyurethane foam structure of the present disclosure may be used in mattresses, cushions, pillows, upholstered furniture, or any other article where in addition to support and/or cushioning both heat and moisture transfer are desired. It is noted, however, that these are merely illustrative implementations of the embodiments disclosed herein. The embodiments may be applicable to other technologies that are susceptible to similar problems (e.g., heat and moisture transfer) as those discussed herein. For example, the coated flexible open-cell polyurethane foam structure described herein may be used in footwear, footwear inserts, protective sporting equipment (e.g., helmets, shoulder pads, shin pads, etc.) and protective clothing (e.g., motorcycle jackets, ear plugs, etc.), among others, all of which are within the purview of the present embodiment.

The flexible heat conductive material, as discussed herein, has a predefined shape on the flexible open-cell polyurethane foam, as discussed herein, so as to provide one or more of a "gap" that expose the flexible open-cell polyurethane foam between defined edges of the flexible heat conductive material. As used herein, a gap is an unfilled space or interval in the flexible open-cell polyurethane foam or a break in continuity of the flexible heat conductive material that exposes the flexible open-cell polyurethane foam.

In one embodiment, the flexible heat conductive material can be applied to and adsorb into and onto the flexible open-cell polyurethane foam. Alternatively, a channel or a groove is formed or provided in the flexible open-cell polyurethane foam, where the flexible heat conductive material fills at least a portion of the channel or the groove. For such a structure (where a channel or a groove is formed or provided in the flexible open-cell polyurethane foam) the flexible heat conductive material can at least fill the channel or groove such that at least a portion of the flexible heat conductive material forms an outer surface of the coated flexible open-cell polyurethane foam that is co-planar with the first major surface of the flexible open-cell polyurethane foam. In an alternative embodiment, the flexible heat conductive material does not completely fill the channel or the groove so that the flexible heat conductive material forms an outer surface of the coated flexible open-cell polyurethane foam that is co-planar with the first major surface of the flexible open-cell polyurethane foam. For such a structure, the flexible heat conductive material only partially fills the channel or groove such that at least a portion of the flexible heat conductive material is not co-planar with the first major surface of the flexible open-cell polyurethane foam. Regardless of the configuration, the flexible heat conductive material forms a three-dimensional structure that is integral with the flexible open-cell polyurethane foam. Such a structure allows the flexible heat conductive material to form at least a part of a first major surface of the coated flexible open-cell polyurethane foam structure, as defined herein. Such a structure also allows the flexible heat conductive material to form at least a part of an interior portion of the coated flexible open-cell polyurethane foam structure near or adjacent to the first major surface.

Referring now to FIG. 1 there is shown an example of the coated flexible open-cell polyurethane foam structure 100 according to an embodiment of the present disclosure. The coated flexible open-cell polyurethane foam structure 100 includes a flexible open-cell polyurethane foam 102 having a first major surface 104 and a second major surface 106 opposite the first major surface 104. The coated flexible open-cell polyurethane foam structure 100 further includes an array of a flexible heat conductive material 108, as discussed herein. For the various embodiment, the flexible heat conductive material 108 covers 30 to 90 percent ("cov. %", expressed in %) of a surface area of the first major surface 104 of the flexible open-cell polyurethane foam 102. The flexible heat conductive material 108 covering 30 to 90 percent of the surface area of the first major surface 104 is in a predefined shape that provides one or more gaps 110 exposing the flexible open-cell polyurethane foam 102 between defined edges 112 of the flexible heat conductive material 108. Each gap 110 of the one or more gaps 110 has a gap width 114 (expressed herein in millimeters (mm) that is determined according to Formula I:

$$\text{gap width (mm)} \leq -0.196 \times \text{cov. \%} + 20.6 \quad \text{(Formula I)}.$$

The gap width 114 calculated using Formula I will in all cases be greater than zero (0). For the various embodiments, the gap width 114 can be determined according to Formula II:

$$\text{gap width (mm)} = -0.196 \times \text{cov. \%} + 20.6 \quad \text{(Formula II)}.$$

For the various embodiments, the gap width 114 is taken as the horizontal measurement taken at right angles to the length of the edges 112 defining the gap 110. Alternatively, the gap width 114 can be the length measured along the first major surface 110 of the flexible open-cell polyurethane foam 102 taken perpendicularly between the edges 112 defining the gap 110. This later embodiment for measuring the gap width 114 allows for the gap width 114 to be measured when the first major surface 110 of the flexible open-cell polyurethane foam 102 is in a curved (curvature is not zero) or non-planar (as opposed to a planar) configuration. For the various embodiments, the curved or non-planar configuration of the first major surface 110 of the flexible open-cell polyurethane foam 102 can be imparted by the presence of a person and/or an object on the flexible open-cell polyurethane foam 102 (i.e., when the coated flexible open-cell polyurethane foam structure 100 is "in use") such that the first major surface 110 at least partially deforms from its initial shape (e.g., a planar shape) to a shape having the curved or non-planar configuration.

As the flexible heat conductive material 108 covers 30 to 90 percent of the surface area of the first major surface 104, the total surface area of the one or more gaps 110 provides 70 to 10 percent of the surface area of the first major surface 104 of the flexible open-cell polyurethane foam 102. The surface area of the flexible heat conductive material 108 and the surface area of the one or more gaps 110 can total 100 percent of the first major surface 104. In one embodiment, the surface area of the flexible heat conductive material 108 and the surface area of the one or more gaps 110 totals 100 percent of the first major surface 104.

As noted, the flexible heat conductive material 108 covers 30 to 90 percent of the surface area of the first major surface 104. All individual values and subranges of this range of surface areas are included and disclosed herein. For example, in some embodiments, the flexible heat conductive material 108 covers 30 to 80 percent; 30 to 70 percent; 30 to 60 percent; 30 to 50 percent; 40 to 90 percent; 50 to 90 percent; 60 to 90 percent or 70 to 90 percent of the surface area of the first major surface 104. Similarly, the surface area of the one or more gaps 110 provides 70 to 10 percent of the surface area of the first major surface 104 of the flexible open-cell polyurethane foam 102, where all individual values and subranges of this range of surface areas are included and disclosed herein. For example, in some embodiments, the surface area of the one or more gaps 110 covers 70 to 20 percent; 70 to 30 percent; 70 to 40 percent; 70 to 50 percent; 60 to 10 percent; 50 to 10 percent; 40 to 10 percent or 30 to 10 percent of the surface area of the first major surface 104.

As illustrated in FIG. 1, the first major surface 104 and the second major surface 106 are shown as being planar surfaces parallel with each other. It is appreciated, however, that other shapes for the surfaces of the coated flexible open-cell polyurethane foam structures are possible, including those where the major surfaces are not planar and/or are not parallel with each other. Other surface shapes can include spherical, semi-spherical, conical, semi-conical, cylindrical, semi-cylindrical, ellipsoidal, semi-ellipsoidal or polygonal, among others.

It is also possible that the flexible heat conductive material sits on top of the first major surface of the flexible open-cell polyurethane foam. For this present embodiment, the flexible heat conductive material could be bonded to the flexible open-cell polyurethane foam with an adhesive so as to allow the flexible heat conductive material to maintain the gap width for the flexible open-cell polyurethane foam.

For the various embodiments, the flexible heat conductive material 108 in the predefined shape can have a thickness of 0.1 to 2 mm. In one embodiment, the thickness of the flexible heat conductive material 108 extends into the flexible open-cell polyurethane foam. Alternatively, the thickness of the flexible heat conductive material 108 extends into the channel or groove in the flexible open-cell polyurethane foam. All individual values and subranges of this range of the thickness are included and disclosed herein. For example, the flexible heat conductive material 108 in the predefined shape can have a thickness of 0.1 to 1.5 mm; 0.1 to 1.0 mm; 0.1 to 0.5 mm; 0.5 to 2.0 mm; 1.0 to 2.0 mm or 1.5 to 2.0 mm.

The predefined shape of the flexible heat conductive material 108 can have a variety of shapes and/or configurations. For example, as illustrated in FIG. 1, the flexible heat conductive material 108 is a single continuous strip on the first major surface 104 of the open-cell flexible open-cell polyurethane foam 102. Also, as illustrated in FIG. 1, the single continuous strip on the first major surface 104 of the flexible open-cell polyurethane foam 102 has a serpentine shape. The flexible heat conductive material 108 in the form of a single continuous strip on the first major surface 104 of open-cell flexible open-cell polyurethane foam 102 can have other shapes. Examples include, but are not limited to, an Archimedean spiral or any other geometric shape possible with the single continuous strip of the flexible heat conductive material 108 that essentially extends around a central point of the first major surface 104 of open-cell flexible open-cell polyurethane foam 102 while maintaining the one or more gaps as discussed herein.

Figure 2:
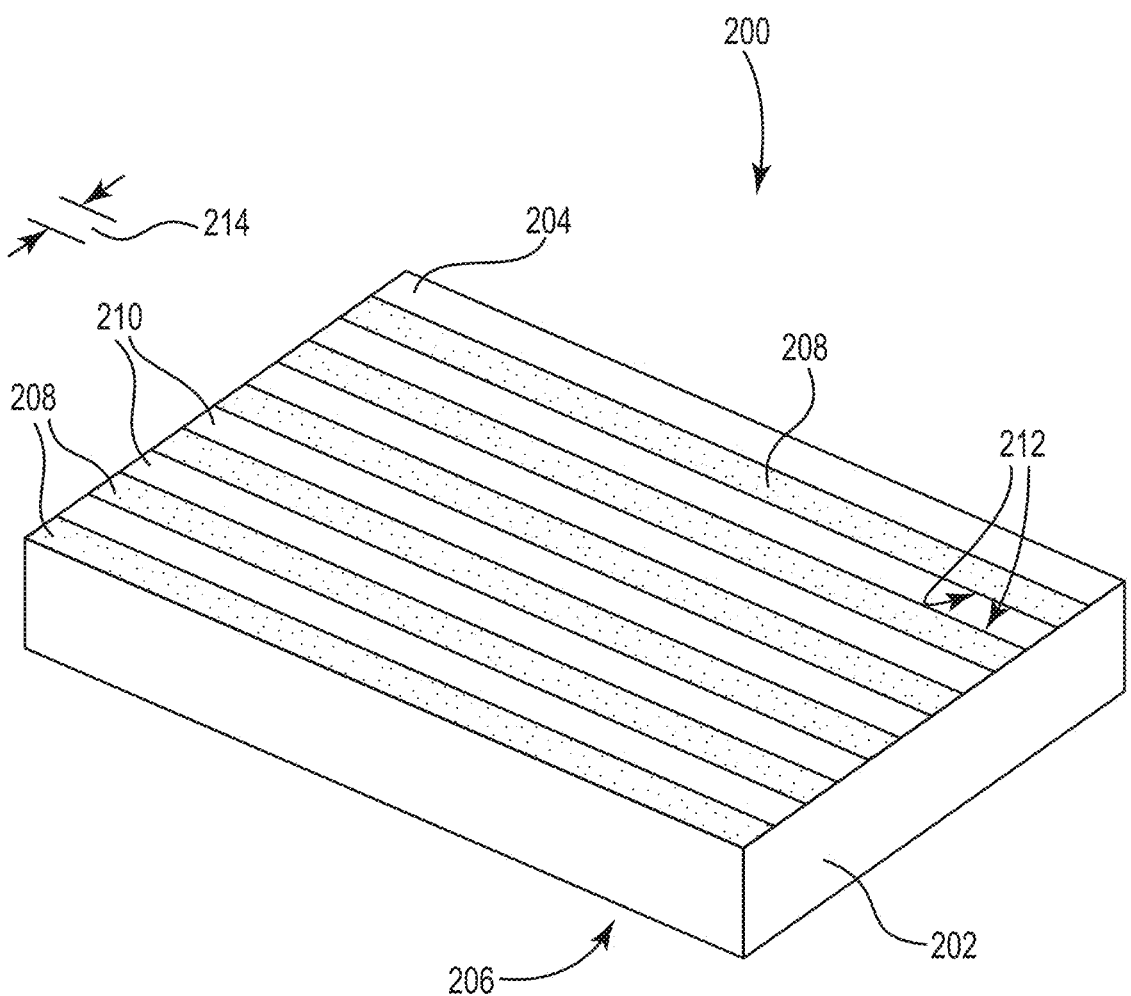
FIG. 2 is an embodiment of the coated flexible open-cell polyurethane foam structure of the present disclosure.

In an alternative embodiment, the predefined shape of the flexible heat conductive material is a series of parallel strips on the first major surface of the flexible open-cell polyurethane foam. An illustration of this embodiment is seen in FIG. 2, where the coated flexible open-cell polyurethane foam structure 200 includes the flexible open-cell polyurethane foam 202 having the first major surface 204 and the second major surface 206 opposite the first major surface 204, as discussed herein. The coated flexible open-cell polyurethane foam structure 200 further includes an array of the flexible heat conductive material 208, as discussed herein, where the predefined shape of the flexible heat conductive material 208 is a series of parallel strips on the first major surface 204 of the flexible open-cell polyurethane foam 202. Also illustrated in FIG. 2 is an embodiment in which the gap width 214 for each of the one or more gaps 210 has the same value.

Figure 3:
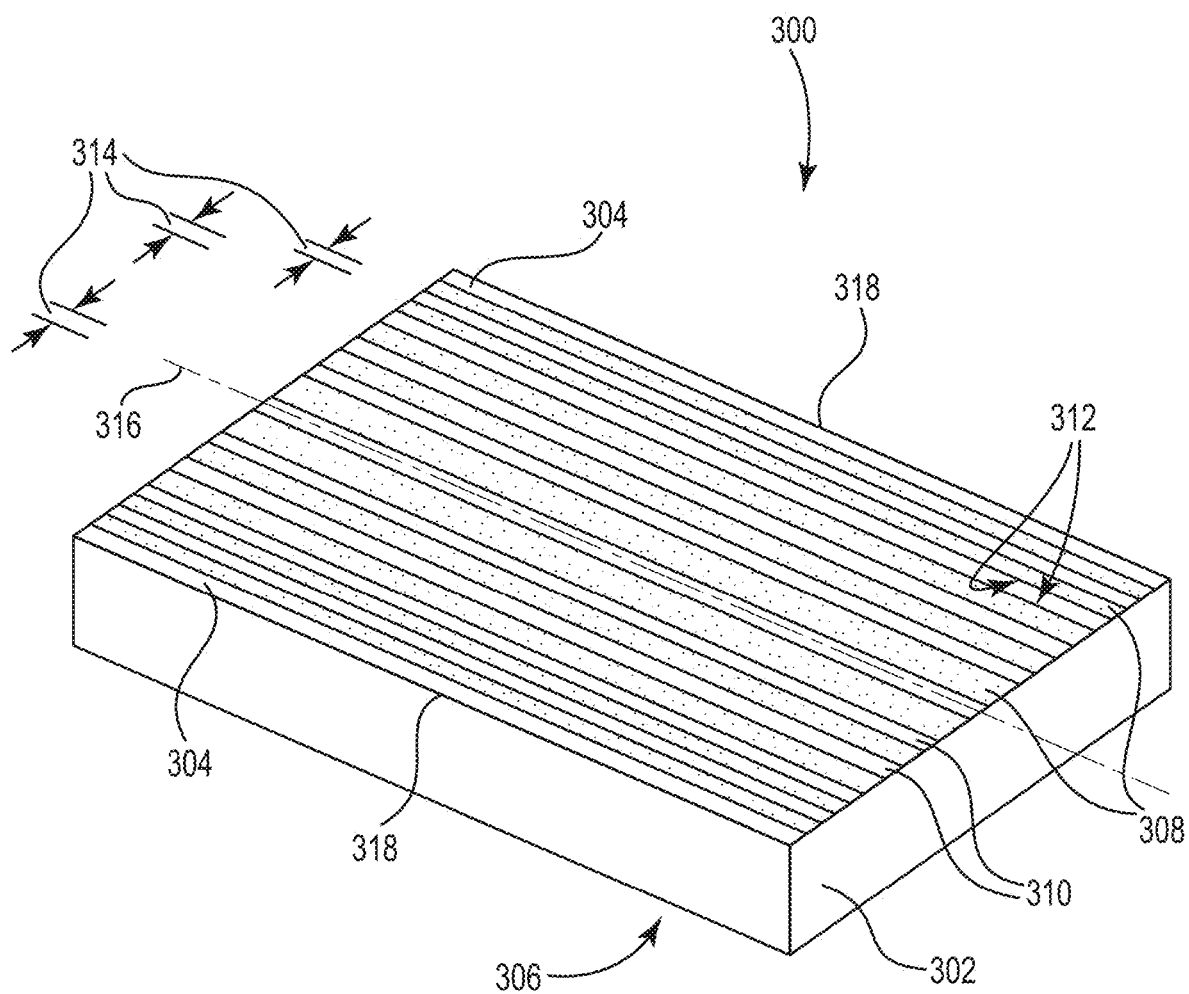
FIG. 3 is an embodiment of the coated flexible open-cell polyurethane foam structure of the present disclosure.

FIG. 3 provides an additional embodiment of the coated flexible open-cell polyurethane foam structure 300 according to the present disclosure. The coated flexible open-cell polyurethane foam structure 300 includes the flexible open-cell polyurethane foam 302 having the first major surface 304 and the second major surface 306 opposite the first major surface 304, as discussed herein. The coated flexible open-cell polyurethane foam structure 300 further includes an array of the flexible heat conductive material 308, as discussed herein, where the gap width 314 for each of the one or more gaps 310 has a different value. As illustrated in FIG. 3, the gap width 314 for the gaps 310 near the center longitudinal axis 316 are larger than the gaps 310 that are near the outer longitudinal edges 318 of the first major surface 304. This configuration allows for the gaps 310 near the center longitudinal axis 316 of the coated flexible open-cell polyurethane foam structure 300 to maintain a gap width that either falls into or remains in the gap width value determined using either Formula I or Formula II when the coated flexible open-cell polyurethane foam structure 300 is in use. For example, when a person is lying on the coated flexible open-cell polyurethane foam structure 300 (e.g., in the form of a mattress) the curved shape of the person laying on the coated flexible open-cell polyurethane foam structure 300 will cause the coated flexible open-cell polyurethane foam structure 300 to take an elongated curved shape as viewed perpendicularly to the center longitudinal axis 316. In taking this shape the "larger" gap width in and around the center longitudinal axis 316 will be reduced as the coated flexible open-cell polyurethane foam structure 300 bends and compresses to receive and support the person laying on the coated flexible open-cell polyurethane foam structure 300. By providing this "larger" gap width in the undeformed coated flexible open-cell polyurethane foam structure 300, the gap that results when the person lays on the coated flexible open-cell polyurethane foam structure 300 will still be within or will achieve the gap width value determined using either Formula I or Formula II when the coated flexible open-cell polyurethane foam structure 300 is in use.

Similarly, the gap width of the coated flexible open-cell polyurethane foam structure 300 in and around the area where the flexible open-cell polyurethane foam structure 300 begins to bend due to the person laying one the structure 300 (close to the edge of where the curved shaped noted above begins) will stretch, thereby increasing the size of the gap. To accommodate for this stretch, gap widths for the coated flexible open-cell polyurethane foam structure 300 away from the center longitudinal axis 316 can be made slightly smaller than those in an around the center longitudinal axis 316 so that when in their stretched state these gaps will still be within or will achieve the gap width value determined using either Formula I or Formula II when the coated flexible open-cell polyurethane foam structure 300 is in use.

Figure 4:
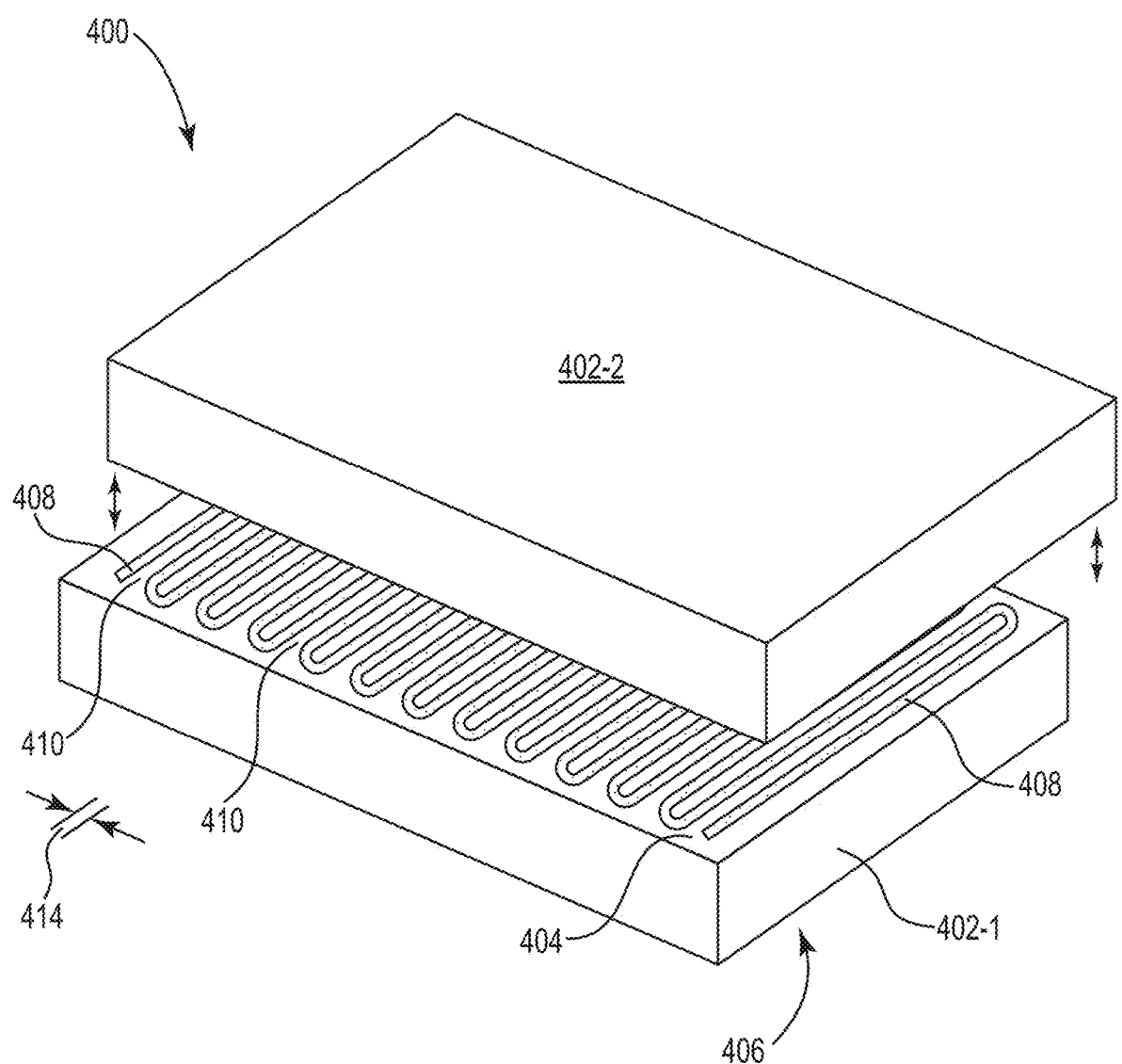
FIG. 4 is an embodiment of the coated flexible open-cell polyurethane foam structure of the present disclosure.

Referring now to FIG. 4, there is shown an embodiment of the coated flexible open-cell polyurethane foam structure 400 where at least a portion of the flexible open-cell polyurethane foam 402-1 and 401-2 completely covers the flexible heat conductive material 408. The illustration of FIG. 4 is shown in an exploded view to allow the flexible heat conductive material 408 to be seen, where in operation the portion of the flexible open-cell polyurethane foam completely covers the flexible heat conductive material 408. As illustrated in FIG. 4, the coated flexible open-cell polyurethane foam structure 400 includes a first portion 402-1 of the flexible open-cell polyurethane foam 402 that includes the flexible heat conductive material 408. The flexible heat conductive material 408 can be in any one of the shapes and/or configurations as provided herein, where the gap width 414 of the one or more gaps 410 is (are) determined using Formula I or Formula II, provided herein. A second portion 402-2 of the flexible open-cell polyurethane foam 402 is positioned over the first portion 402-1 of the flexible open-cell polyurethane foam 402 so as to "sandwich" the flexible heat conductive material 408 between the flexible open-cell polyurethane foam 402 of the first portion 402-1 and the second portion 402-2 of the coated flexible open-cell polyurethane foam structure 400.

It is also possible to have two or more arrays of the flexible heat conductive material, as discussed herein, in the coated flexible open-cell polyurethane foam structure. For example, a first array of the flexible heat conductive material could be sandwiched between the flexible open-cell polyurethane foam of a first portion and a second portion of the coated flexible open-cell polyurethane foam structure (as seen in FIG. 4), while a second array of the flexible heat conductive material could be located at the outer surface of the second portion of the coated flexible open-cell polyurethane foam structure (e.g., similar to the array of the flexible heat conductive material seen in any one of FIG. 1, 2 or 3). In this way, the arrays of the flexible heat conductive material are in a stacked configuration that would help to allow for more of the flexible heat conductive material to be present in the coated flexible open-cell polyurethane foam structure of the present disclosure.

Flexible Open-Cell Polyurethane Foam

As discussed herein, the embodiments of the coated flexible open-cell polyurethane foam structure use flexible open-cell polyurethane foam. As discussed herein, the flexible open-cell polyurethane foam can be a viscoelastic open-cell polyurethane foam. The viscoelastic polyurethane foam, in one embodiment, may be characterized as having a resiliency that is less than or equal to 20% as measured according to ASTM D3574 Test H, which may also be referred to as a Ball Rebound Test. For example, the resiliency may be less than 15%, less than 10%, less than 8%, less than 7%, less than 4%, and/or less than 3%. In all cases, the resiliency may be greater than 1%.

Viscoelastic polyurethane foams may be prepared using a reaction system that includes an isocyanate component and an isocyanate-reactive component. In particular, the viscoelastic foam is formed as the reaction product of the isocyanate component and the isocyanate-reactive component. The isocyanate component includes at least one isocyanate such as an isocyanate-terminated prepolymer and/or a polyisocyanate. The isocyanate-reactive component includes at least one compound having an isocyanate reactive hydrogen atom group, such as a hydroxyl group and/or an amine group. The isocyanate component and/or the isocyanate-reactive component may include an additive such a catalyst, a curing agent, a surfactant, a blowing agent, a polyamine, and/or a filler, among other materials.

According to embodiments, the isocyanate-reactive component can include at least three components. In particular, the isocyanate-reactive component can include a polyol component, an additive component, and a preformed aqueous polymer dispersion.

The polyol component accounts for 50.0 weight percent (wt. %) to 99.8 wt. % of the isocyanate-reactive component, so as to be the majority component in the reaction system for forming the viscoelastic polyurethane foam. Other value ranges for polyol component can include 60.0 wt. % to 99.8 wt. %, 70.0 wt. % to 99.5 wt. %, 80.0 wt. % to 99.0 wt. % and 90.0 wt. % to 99.0 wt. %. The polyol component includes at least one polyether polyol and may optionally include at least one polyester polyol.

The additive component may include a catalyst, a curing agent, a surfactant, a blowing agent, a polyamine, water, and/or a filler. The additive component accounts for 0.1 wt.

% to 50.0 wt. % of the additive component, based on the total weight of the isocyanate-reactive component. Other value ranges for the additive component can include 0.1 wt. % to 40.0 wt. %, 0.1 wt. % to 30.0 wt. %, 0.1 wt. % to 20.0 wt. %, 0.1 wt. % to 15.0 wt. %, 0.1 wt. % to 10.0 wt. % or 0.1 wt. % to 5.0 wt. %. The additive component in exemplary embodiments includes at least one catalyst and at least one surfactant.

The optional preformed aqueous polymer dispersion may account for 0.1 wt. % to 6.0 wt. % of the isocyanate-reactive component. Other value ranges for the optional preformed aqueous polymer dispersion can include 0.1 wt. % to 5.0 wt. %, 0.1 wt. % to 4.5 wt. %, 0.1 wt. % to 4.0 wt. %, 0.1 wt. % to 3.5 wt. %, 0.1 wt. % to 3.0 wt. %, 0.4 wt. % to 2.5 wt. % or 0.5 wt. % to 2.0 wt. %. The preformed aqueous polymer dispersion is one of an aqueous acid polymer dispersion or an aqueous acid-modified polyolefin polymer dispersion in which the polyolefin is derived from at least one $C_2$ to $C_{20}$ alpha-olefin (e.g., at least one $C_2$ to $C_{20}$ alpha-olefin and/or $C_2$ to $C_8$ alpha-olefin). The preformed aqueous polymer dispersion has a solids content from 10 wt. % to 80 wt. %, based on the total weight of the preformed aqueous polymer dispersion. The aqueous polymer dispersion may be a combination of one or more aqueous polymer dispersions that are used to form the viscoelastic polyurethane foam.

The viscoelastic foam may be a free rise foam or molded foam that is optionally prepared using at least one selected from the group of the preformed aqueous polymer dispersion and preformed aqueous polymer dispersant, whereas they differ from each other by composition. Exemplary embodiments may include the preformed aqueous polymer dispersion only, the preformed aqueous polymer dispersant only, or a combination of the preformed aqueous polymer dispersion and the preformed aqueous polymer dispersant.

The viscoelastic foam prepared using the preformed aqueous polymer dispersant additive may have an air flow greater than 4.0 standard cubic foot per minute (scfm) (approximately 1.9 L/s) under standard conditions. The viscoelastic foam may have an air flow greater than 5.0 standard cubic foot per minute (scfm) (approximately 2.4 L/s) under standard conditions. The viscoelastic foam may have a recovery time (also referred to as viscoelastic recovery time) of less than 20 seconds (e.g., less than 10 seconds and/or less than 5 seconds). For example, a viscoelastic polyurethane foam may be prepared that has an increased air flow without sacrificing resiliency.

Polyol Component

The polyol component includes at least one polyether polyol and/or polyester polyol. Exemplary polyether polyols are the reaction product of alkylene oxides (such as at least one ethylene oxide, propylene oxide, and/or butylene oxide) with initiators containing from 2 to 8 active hydrogen atoms per molecule. Exemplary initiators include ethylene glycol, diethylene glycol, propylene glycol, dipropylene glycol, butane diol, glycerol, trimethylolpropane, triethanolamine, pentaerythritol, sorbitol, ethylene diamine, toluene diamine, diaminodiphenylmethane, polymethylene polyphenylene polyamines, ethanolamine, diethanolamine, and mixtures of such initiators. Exemplary polyols include VORANOL™ products, available from The Dow Chemical Company. The polyol component may include polyols that are useable to form viscoelastic polyurethane foams.

For example, the polyol component may include a polyoxyethylene-polyoxypropylene polyether polyol that has an ethylene oxide content of at least 50 wt. % (based on a total weight of the alkylene oxides used to form the polyol), that has a nominal hydroxyl functionality from 2 to 6 (e.g., 2 to 4), and has a number average molecular weight from 500 g/mol to 5000 g/mol (e.g., 500 g/mol to 4000 g/mol, from 600 g/mol to 3000 g/mol, 600 g/mol to 2000 g/mol, 700 g/mol to 1500 g/mol, and/or 800 g/mol to 1200 g/mol). The polyoxyethylene-polyoxypropylene polyether polyol that has an ethylene oxide content of at least 50 wt. % may account for 5 wt. % to 90 wt. % (e.g., 10 wt. % to 90 wt. %, 25 wt. % to 90 wt. %, 25 wt. % to 85 wt. %, 35 wt. % to 85 wt. %, 45 wt. % to 85 wt. %, 50 wt. % to 80 wt. %, and/or 55 wt. % to 70 wt. %) of the isocyanate-reactive component. The polyoxyethylene-polyoxypropylene polyether polyol that has an ethylene oxide content of at least 50 wt. % may be the majority component in the isocyanate-reactive component.

The polyol component may include a high molecular weight polyoxyethylene-polyoxypropylene polyether polyol that has an ethylene oxide content of at least 50 wt. % (based on a total weight of the alkylene oxides used to form the polyol), that has a nominal hydroxyl functionality from 4 to 8 (e.g., 5 to 8), and has a number average molecular weight from 5,500 g/mol to 20,000 g/mol (e.g., 5,500 g/mol to 17,500 g/mol, from 5,500 g/mol to 15,500 g/mol, 5,500 g/mol to 14,500 g/mol, 6,500 g/mol to 14,500 g/mol, 8,500 g/mol to 14,500 g/mol, and/or 10,500 g/mol to 14,500 g/mol). The polyoxyethylene-polyoxypropylene polyether polyol that has an ethylene oxide content of at least 50 wt. % may account for 5 wt. % to 90 wt. % (e.g., 5 wt. % to 75 wt. %, 5 wt. % to 55 wt. %, 5 wt. % to 50 wt. %, 5 wt. % to 45 wt. %, 5 wt. % to 35 wt. %, 5 wt. % to 25 wt. %, and/or 10 wt. % to 20 wt. %) of the isocyanate-reactive component. The high molecular weight polyoxyethylene-polyoxypropylene polyether polyol may be in addition to the relatively lower molecular weight polyoxyethylene-polyoxypropylene polyether polyol discussed herein.

The polyol component may include a polyoxypropylene-polyoxyethylene polyether polyol that has an ethylene oxide content of less than 20 wt. % based on a total weight of the alkylene oxides used to form the polyol, that has a nominal hydroxyl functionality from 2 to 6 (e.g., 2 to 4), and has a number average molecular weight greater than 1000 g/mol (or greater than 1500 g/mol) and less than 6000 g/mol. For example, the molecular weight may be from 1500 g/mol to 5000 g/mol, 1600 g/mol to 5000 g/mol, 2000 g/mol to 4000 g/mol, and/or 2500 g/mol to 3500 g/mol. The polyoxypropylene-polyoxyethylene polyether polyol that has an ethylene oxide content of less than 20 wt. % may account for 5 wt. % to 90 wt. % (e.g., 5 wt. % to 70 wt. %, 5 wt. % to 50 wt. %, 10 wt. % to 40 wt. %, and/or 10 wt. % to 30 wt. %) of the isocyanate reactive component. The polyoxypropylene-polyoxyethylene polyether polyol that has an ethylene oxide content of less than 20 wt. % may be in a blend with the polyoxypropylene polyether polyol that has an ethylene oxide content of at least 50 wt. %, whereas the latter of which is included in a greater amount.

The polyol component may include a polyoxypropylene polyether polyol that has a nominal hydroxyl functionality from 2 to 6 (e.g., 2 to 4) and has a number average molecular weight from 500 g/mol to 6000 g/mol (e.g., 500 g/mol to 5500 g/mol, from 600 g/mol to 5000 g/mol, 700 g/mol to 1500 g/mol, 800 g/mol to 1200 g/mol, 3000 g/mol to 6000 g/mol, 3000 g/mol to 5500 g/mol, 3500 g/mol to 5500 g/mol, and/or 4500 g/mol to 5500 g/mol). The polyoxypropylene polyether polyol may account for 5 wt. % to 90 wt. % (e.g., 5 wt. % to 70 wt. %, 5 wt. % to 50 wt. %, 10 wt. % to 40 wt. %, and/or 10 wt. % to 30 wt. %) of the isocyanate reactive component. The polyoxypropylene polyether polyol may be in a blend with the polyoxypropylene polyether polyol that has an ethylene oxide content of at least 50 wt. %, whereas the latter of which is included in a greater amount.

In an exemplary embodiment, the polyol component may include a blend of the polyoxyethylene-polyoxypropylene polyether polyol that has an ethylene oxide content of at least 50 wt. %, the polyoxyethylene-polyoxypropylene polyether polyol that has an ethylene oxide content of less than 20 wt. %, and/or the polyoxypropylene polyether polyol. In other exemplary embodiments, the polyol component may include a blend of the polyoxyethylene-polyoxypropylene polyether polyol that has an ethylene oxide content of at least 50 wt. %, the higher molecular weight polyoxyethylene-polyoxypropylene polyether polyol that has an ethylene oxide content of at least 50 wt. %, the polyoxyethylene-polyoxypropylene polyether polyol that has an ethylene oxide content of less than 20 wt. %, and/or the polyoxypropylene polyether polyol.

The polyol component may be mixed with the preformed aqueous polymer dispersion (and optionally at least part of the additive component) before contacting the isocyanate component.

Additive Component

The additive component is separate from the components that form the preformed aqueous dispersion and the polyol component. The additive component is part of the isocyanate-reactive component, but other additives may be incorporated into the isocyanate component. The additive component may include a catalyst, a curing agent, a crosslinker, a surfactant, a blowing agent (aqueous and non-aqueous, separate from the aqueous polymer dispersion), a polyamine, a plasticizer, a fragrance, a pigment, an antioxidant, a UV stabilizer, water (separate from the aqueous polymer dispersion), and/or a filler. Other exemplary additives include a chain extender, flame retardant, smoke suppressant, drying agent, talc, powder, mold release agent, rubber polymer ("gel") particles, and other additives that are known in the art for use in viscoelastic foams and viscoelastic foam products.

The additive component may include tin catalyst, zinc catalyst, bismuth catalyst, and/or amine catalyst. The total amount of catalyst in the isocyanate-reactive component may be from 0.1 wt. % to 3.0 wt. %.

A surfactant may be included in the additive component, e.g., to help stabilize the foam as it expands and cures. Examples of surfactants include nonionic surfactants and wetting agents such as those prepared by the sequential addition of propylene oxide and then ethylene oxide to propylene glycol, solid or liquid organosilicones, and polyethylene glycol ethers of long chain alcohols. Ionic surfactants such as tertiary amine or alkanolamine salts of long chain alkyl acid sulfate esters, alkyl sulfonic esters, and alkyl arylsulfonic acids may be used. For example, the formulation may include a surfactant such as an organosilicone surfactant. The total amount of an organosilicone surfactant in the isocyanate-reactive component may be from 0.1 wt. % to 5.0 wt. %, 0.1 wt. % to 3.0 wt. %, 0.1 wt. % to 2.0 wt. %, and/or 0.1 wt. % to 1.0 wt. %.

The additive component may include water, which is separate from the preformed aqueous polymer dispersion. The water may account for less than 2.0 wt. % of the total weight of isocyanate-reactive component. The total water, including water from the preformed aqueous polymer dispersion and water from the additive component, may account for less than 5 wt. % of the total weight of isocyanate-reactive component.

The additive component may exclude any conventional polyurethane foam chemical cell openers based on the use of the aqueous polymer dispersion. The additive component may exclude polybutene, polybutadiene, and waxy aliphatic hydrocarbons such as oils (e.g., mineral oil, paraffin oil, and/or naphthenic oil) that are commonly employed cell openers in low resiliency foams. The additive component may exclude cell openers that are polyols derived primarily from alkoxylation of α,β-alkylene oxides having at least 4 carbon atoms, e.g., as discussed in U.S. Pat. No. 4,596,665. The additive component may exclude cell openers that are polyethers of up to about 3500 molecular weight that contain a high proportion (usually 50 percent or higher) of units derived from ethylene oxide or butylene oxide, e.g., as discussed in the background section of U.S. Pat. No. 4,863,976. The additive component may exclude cell openers that are polyether polyols having a molecular weight of at least 5000 and having at least 50 wt. % of oxyethylene units, e.g., as discussed in the claims of U.S. Pat. No. 4,863,976.

Isocyanate Component

The isocyanate component includes at least one isocyanate. The isocyanate component is present at an isocyanate index from 50 to 150. Other value ranges for the isocyanate index include from 60 to 140, from 65 to 130, from 65 to 100, from 65 to 95, from 65 to 90, and/or from 65 to 85. The isocyanate index is defined as the molar stoichiometric excess of isocyanate moieties in a reaction mixture with respect to the number of moles of isocyanate-reactive units (active hydrogens available for reaction with the isocyanate moiety), multiplied by 100. An isocyanate index of 100 means that there is no stoichiometric excess, such that there is 1.0 mole of isocyanate groups per 1.0 mole of isocyanate-reactive groups, multiplied by 100.

The isocyanate component may include one or more isocyanate such as polyisocyanate and/or isocyanate-terminated prepolymer. The isocyanate may be isocyanate-containing reactants that are aliphatic, cycloaliphatic, alicyclic, arylaliphatic, and/or aromatic polyisocyanates or derivatives thereof. Exemplary derivatives include allophanate, biuret, and NCO (isocyanate moiety) terminated prepolymer. For example, the isocyanate component may include at least one aromatic isocyanate, e.g., at least one aromatic polyisocyanate or at least one isocyanate-terminated prepolymer derived from an aromatic polyisocyanate. The isocyanate component may include at least one isomer of toluene diisocyanate (TDI), crude TDI, at least one isomer of diphenyl methylene diisocyanate (MDI), crude MDI, and/or higher functional methylene polyphenyl polyisocyanate. Examples include TDI in the form of its 2,4 and 2,6-isomers and mixtures thereof and MDI in the form of its 2,4'-, 2,2'- and 4,4'-isomers and mixtures thereof. The mixtures of MDI and oligomers thereof may be crude or polymeric MDI and/or a known variant of MDI comprising urethane, allophanate, urea, biuret, carbodiimide, uretonimine and/or isocyanurate group. Exemplary isocyanates include VORANATE™ M 220 (a polymeric methylene diphenyl diisocyanate available from The Dow Chemical Company). Other exemplary polyisocyanate include tolylene diisocyanate (TDI), isophorone diisocyanate (IPDI) and xylene diisocyanates (XDI), and modifications thereof Preformed Aqueous Polymer Dispersion The aqueous polymer dispersion includes at least (a) a base polymer including an acid polymer and/or an acid-modified polyolefin polymer and (b) a fluid medium (in this case water), in which the base polymer is dispersed in the fluid medium. The preformed aqueous polymer dispersion may be a continuous liquid phase component at ambient conditions of room temperature and atmospheric pressure and is derived from a liquid phase (i.e., the fluid medium) and a solid phase (i.e., the base polymer).

In embodiments, the preformed aqueous polymer dispersion is one of an aqueous acid polymer dispersion or an aqueous acid-modified polyolefin polymer dispersion in which the polyolefin is derived from at least one $C_2$ to $C_{20}$ alpha-olefin. By aqueous acid polymer dispersion it is meant an aqueous dispersion prepared with an acid based polymer. By aqueous acid-modified polyolefin polymer dispersion it is meant an aqueous dispersion prepared with an acid-modified polyolefin polymer. By derived from at least one $C_2$ to $C_{20}$ alpha-olefin it is meant that the polyolefin is a polymer prepared using at least one alpha-olefin, in which each alpha-olefin used is one of a $C_2$ to $C_{20}$ alpha-olefin (e.g., the polyolefin may be derived from at least one of ethylene, propylene, butylene, hexene, and/or octene). In exemplary embodiments, the polyolefin may be an ethylene based polymer and/or a propylene based polymer.

As used herein, by polymer it meant a compound prepared by polymerizing monomers, whether of the same or a different type. Thus, the term polymer embraces the term homopolymer, usually employed to refer to polymers prepared from only one type of monomer, and the term interpolymer. It also embraces all forms of interpolymers, e.g., random, block, homogeneous, heterogeneous, etc. By copolymer/interpolymer it is meant a polymer prepared by the polymerization of at least two different types of monomers. These terms include both classical copolymers, i.e., polymers prepared from two different types of monomers, and polymers prepared from more than two different types of monomers, e.g., terpolymers, tetrapolymers, etc.

By ethylene based polymer it is meant a polymer that includes a majority weight percent polymerized ethylene monomer (based on the total weight of polymerizable monomers), and optionally may comprise at least one polymerized comonomer different from ethylene (such as at least one selected from a $C_3$ to $C_{20}$ alpha-olefin) so as to form an ethylene-based interpolymer. For example, when the ethylene-based polymer is an ethylene-propylene copolymer, the amount of ethylene may be greater than 50 wt. %, based on the total weight to the copolymer. "Units derived from ethylene" and like terms mean the units of a polymer that formed from the polymerization ethylene monomers.

By propylene based polymer it is meant a polymer that includes a majority weight percent polymerized propylene monomer (based on the total weight of polymerizable monomers), and optionally may comprise at least one polymerized comonomer different from propylene (such as at least one selected from a $C_2$ and $C_4$ to $C_{20}$ alpha-olefin) so as to form an propylene-based interpolymer. For example, when the propylene-based polymer is a propylene-ethylene copolymer, the amount of propylene may be greater than 50 wt. %, based on the total weight to the copolymer. "Units derived from propylene" and like terms mean the units of a polymer that formed from the polymerization propylene monomers.

Exemplary aqueous acid polymer dispersion may include ethylene-acrylic acid interpolymers, ethylene-methacrylic acid interpolymers, and/or ethylene-crotonic acid interpolymers. The ethylene-acrylic acid interpolymer is prepared by the copolymerization of at least ethylene and acrylic acid. The ethylene-methacrylic acid interpolymer is prepared by copolymerization of at least ethylene and methacrylic acid. The ethylene-crotonic acid interpolymer is prepared by copolymerization of at least ethylene and crotonic acid. It is understood that in such an aqueous acid polymer dispersion, exemplary embodiments are not limited to just ethylene-acrylic acid interpolymers, ethylene-methacrylic acid interpolymers, and/or ethylene-crotonic acid interpolymers. For example, ethylene can be copolymerized with more than one of the following: acrylic acid, methacrylic acid, and/or crotonic acid.

Exemplary aqueous acid polymer dispersions may include at least one ethylene-acrylic acid (EAA) copolymer (and/or ethylene-methacrylic acid copolymer) as the base polymer that is dispersed in the fluid medium (in this case water). The dispersion may be enabled by BLUEWAVE™ Technology, which is a proprietary and patented mechanical-dispersion technology that is a trademark of The Dow Chemical Company or an affiliated company of The Dow Chemical Company. For example, the EAA may be prepared by copolymerization of ethylene with acrylic acid, which yields ethylene-acrylic acid EAA copolymers. The ethylene-acrylic acid copolymer may have an acrylic acid content of at least 10 wt. % (e.g., from 10 wt. % to 70 wt. %, from 10 wt. % to 60 wt. %, from 10 wt. % to 50 wt. %, from 10 wt. % to 40 wt. %, from 10 wt. % to 30 wt. %, and/or from 15 wt. % to 25 wt. %). Exemplary EAA copolymers are available as PRIMACOR™ products, available from SK Global Chemical. The EAA copolymer may have a melt index from 100 to 2000 g/10 minute (ASTM Method D-1238 at 190° C. and 2.16 kg). The EAA copolymer may have a Brookfield viscosity from 5,000 to 13,000 cps at 350° F. and is available from The Dow Chemical Company.

The ethylene-methacrylic acid copolymer may be prepared by copolymerization of ethylene with methacrylic acid. Exemplary, ethylene-acrylic acid, ethylene-methacrylic acid, and/or ethylene-crotonic acid copolymers are discussed in U.S. Pat. Nos. 4,599,392 and/or 4,988,781.

Exemplary aqueous acid-modified polyolefin polymer dispersions include dispersions sold as HYPOD™ products, available from The Dow Chemical Company. The HYPOD™ products may be enabled by BLUEWAVE™ Technology, which is a proprietary and patented mechanical-dispersion technology that is a trademark of The Dow Chemical Company or an affiliated company of The Dow Chemical Company. BLUEWAVE™ Technology may utilize a high-shear mechanical process that may work by taking traditional thermoplastic polymers and elastomers and breaking them up into submicron particles. The aqueous acid-modified polymer dispersions may include propylene based dispersions and ethylene-based dispersions, which may combine the performance of high-molecular-weight thermoplastics and elastomers with the application advantages of a high-solids waterborne dispersion. The polyolefin of the dispersion may be a metallocene catalyzed polyolefin. Exemplary polyolefins are sold in the AFFINITY™, ENGAGE™, VERSIFY™, and INFUSE™ products, available from The Dow Chemical Company.

The aqueous polymer dispersion may be prepared by using a neutralizing agent. Exemplary neutralizing agents include ammonia, ammonium hydroxide, potassium hydroxide, sodium hydroxide, lithium hydroxide, and combinations thereof. For example, if a polar group of the base polymer is acidic or basic in nature, the polymer may be partially or fully neutralized with a neutralizing agent to form a corresponding salt. With the acid polymer modified dispersion prepared using EAA is used, the neutralizing agent is a base, such as ammonium hydroxide, potassium hydroxide, and/or sodium hydroxide. Those having ordinary skill in the art will appreciate that the selection of an appropriate neutralizing agent may depend on the specific composition formulated, and that such a choice is within the knowledge of those of ordinary skill in the art.

The aqueous polymer dispersion may be prepared in an extrusion process, e.g., as discussed in U.S. Pat. No. 8,318,257.

Preformed Aqueous Polymer Dispersant

The preformed aqueous polymer dispersant includes at least (a) a polymeric component that includes a base polymer that is derived from 20 wt. % to 100 wt. % (e.g., 30 wt. % to 100 wt. %, 40 wt. % to 100 wt. %, 50 wt. % to 100 wt. %, etc.) of at least one hydrophilic acid monomer having at least one carbonyl group, phosphate group, phosphonate group, or sulfonyl group, or other acidic groups (which includes any combination thereof), and optionally derived from at least one hydrophobic terminally unsaturated hydrocarbon monomer; and (b) a fluid medium that includes at least water, in which the base polymer is dispersed in the fluid medium. As used herein, by polymer it meant a compound prepared by polymerizing monomers, whether of the same or a different type. Thus, the term polymer embraces the term homopolymer, usually employed to refer to polymers prepared from only one type of monomer, and the term interpolymer. It also embraces all forms of interpolymers, e.g., random, block, homogeneous, heterogeneous, etc. By copolymer/interpolymer it is meant a polymer prepared by the polymerization of at least two different types of monomers. These terms include both classical copolymers, i.e., polymers prepared from two different types of monomers, and polymers prepared from more than two different types of monomers, e.g., terpolymers, tetrapolymers, etc. The base polymer may be derived from one monomer or may be a copolymer derived from at least two different monomers. The base polymer may have controlled microstructure, molecular weight distribution, and/or molecular weight. The base polymer may have a number average molecular weight (Mn) from 1000 to 25,000 g/mol.

Mn refers to the number average molecular weight of the dispersant, e.g., as determined by any the following method: dispersants are dissolved at a concentration of 2 mg/mL in a 20 mM solution of sodium dihydrogen phosphate at pH 7 and passed through a 0.45 μm filter and 100 μL injected into a TSKgel GMPW XL packed column (7.5 mm×30 cm, Tosoh) in tandem with a TSKgel G2500PW XL packed column (7.5 mm×30 cm, Tosoh) at a flow rate of 1 mL/min. The elution is monitored by a refractive index detector and molecular weight profile assessed versus poly(acrylic acid) reference standards ranging in molecular weight from 216 g/mol to 1,100,000 g/mol.

For example, the base polymer may be derived from at least one hydrophilic acid monomer having at least one carbonyl group, e.g., derived from an ethylenically unsaturated carboxylated monomer or derived from a monomer that can be hydrolyzed to give multiple carboxylic acid functional groups. Examples of ethylenically unsaturated carboxylated monomers include acrylic acid, crotonic acid, methacrylic acid, cinnamic acid, alpha-chloroacrylic acid, maleic acid, itaconic acid, fumaric acid, glutaconic acid, traumatic acid, citraconic acid, mesaconic acid, and aconitic acid. Examples of monomers that can be hydrolyzed to give multiple carboxylic acid functional groups include maleic anhydride, citraconic anhydride, itaconic anhydride, tetrahydrophthalic anhydride, traumatic anhydride, and glutaconic anhydride. For example, the monomers that can be hydrolyzed to give multiple carboxylic acid functional groups may be an acid anhydride. In exemplary embodiments, the hydrophilic acid monomer may be a carboxylic acid having more than one carbonyl group or an acid anhydride.

The base polymer may be derived from at least one hydrophilic acid monomer having at least one phosphate group, e.g., derived from phosphoric acid or esters thereof (e.g., ones known to a person of ordinary skill in the art). The base polymer may be derived from at least one hydrophilic acid monomer having at least one phosphonate group, e.g., derived from phosphonic acids or esters thereof (e.g., ones known to a person of ordinary skill in the art). The base polymer may be derived from at least one hydrophilic acid monomer having at least one sulfonyl group, e.g., derived from sulfonic acid or substituents obtained from sulfonic acid (e.g., ones known to a person of ordinary skill in the art).

In exemplary embodiments, the base polymer may be derived from any combination of the hydrophilic acid monomers having at least one carbonyl group (such as an acid anhydride group) phosphate group, phosphonate group, or sulfonyl group. For example, the base polymer may be a copolymer derived from two different hydrophilic acid monomers, e.g., derived from two different ethylenically unsaturated carboxylated monomers, derived from two different monomers that can be hydrolyzed to give multiple carboxylic acid functional groups. For example, the base polymer may be derived from one ethylenically unsaturated carboxylated monomer and one monomer that can be hydrolyzed to give multiple carboxylic acid functional groups.

In further exemplary embodiments, the base polymer may be derived from any combination of the of the hydrophilic acid monomers having at least one carbonyl group (such as an acid anhydride group), phosphate group, phosphonate group, or sulfonyl group, and a hydrophobic terminally unsaturated hydrocarbon monomer. For example, the base polymer may be derived from one monomer that can be hydrolyzed to give multiple carboxylic acid functional groups and one hydrophobic terminally unsaturated hydrocarbon monomer.

Examples of the hydrophobic terminally unsaturated hydrocarbon monomers include $C_2$ to $C_{20}$ alpha-olefins, ethylenically unsaturated aromatic compounds (such as styrene), and alkyl esters of ethylenically unsaturated carboxylated monomers (such as methyl acrylate, ethyl acrylate, butyl acrylate, methyl methacrylate, ethyl methacrylate, and butyl methacrylate). For example, the hydrophobic terminally unsaturated hydrocarbon monomer may be one of selected from a $C_2$ to $C_{10}$ alpha-olefin or may be styrene. Nonlimiting examples of a sulfonated ethylenically unsaturated monomer include 2-acrylamido-2-methylpropane sulfonic acid and its salts. Nonlimiting examples of a phosphated ethylenically unsaturated monomer include 2-(phosphonooxy)ethyl methacrylate and its salts. Nonlimiting examples of a phosphonated ethylenically unsaturated monomer include vinylphosphonic acid and its salts. Exemplary embodiments include at least one ethylenically unsaturated carboxylated monomers.

The preformed aqueous polymer dispersant includes from 5 wt. % to 60 wt. % (e.g., 5 wt. % to 50 wt. %, 10 wt. % to 50 wt. %, 15 wt. % to 45 wt. %, 15 wt. % to 40 wt. %, 20 wt. % to 36 wt. %, etc.) of a polymeric component and from 40 wt. % to 95 wt. % of a fluid medium that includes at least water. For example, the preformed aqueous polymer dispersant may consist essentially of the polymeric component and the fluid medium. The polymeric component may consist essentially of the base polymer. The preformed aqueous polymer dispersant may contain other components, nonlimiting examples include surfactants, organic solvents, initiator and chain transfer residues, and fillers.

The preformed aqueous polymer dispersant has a pH from 6.0 to 12.0 (e.g., from 6.5 to 12.0, from 8.0 to 12.0, from 8.0 to 11.5, from 8.0 to 11.0, from 8.0 to 10.5, from 8.0 to 10.0, etc.). The preformed aqueous polymer dispersant may be a continuous liquid phase component at ambient conditions of room temperature and atmospheric pressure and is derived from a liquid phase (i.e., the fluid medium) and a solid phase (i.e., the base polymer). The preformed aqueous polymer dispersant may have a solids content from 10 wt. % to 80 wt. % (e.g., from 25 wt. % to 75 wt. %, etc.), based on the total weight of the preformed aqueous polymer dispersant.

The aqueous polymer dispersant may be prepared by using a neutralizing agent. Exemplary neutralizing agents include ammonia, ammonium hydroxide, potassium hydroxide, sodium hydroxide, lithium hydroxide, calcium hydroxide, magnesium hydroxide, zinc hydroxide, calcium oxide, magnesium oxide, zinc oxide, and combinations thereof. For example, if a polar group of the base polymer is acidic or basic in nature, the polymer may be partially or fully neutralized with a neutralizing agent to form a corresponding salt. For example, with a dispersant prepared using acrylic acid, the neutralizing agent is a base, such as ammonium hydroxide, potassium hydroxide, and/or sodium hydroxide. Those having ordinary skill in the art will appreciate that the selection of an appropriate neutralizing agent may depend on the specific composition formulated, and that such a choice is within the knowledge of those of ordinary skill in the art.

The preformed aqueous polymer dispersant accounts for 0.1 wt. % to 6.0 wt. % (e.g., 0.1 wt. % to 5.0 wt. %, 0.1 wt. % to 4.1 wt. %, 0.1 wt. % to 4.0 wt. %, 0.1 wt. % to 3.5 wt. %, 0.1 wt. % to 3.0 wt. %, 0.4 wt. % to 2.5 wt. %, 0.5 wt. % to 2.4 wt. %, etc.) of the isocyanate-reactive component. The aqueous polymer dispersant may be a combination of one or more aqueous polymer dispersants that are used to form the viscoelastic polyurethane foam.

The calculated total water content for the reaction system used to form the viscoelastic foam may be less than 5 wt. %, less than 3 wt. %, less than 2.0 wt. %, and/or less than 1.6 wt. %, based on the total weight of the reaction system for forming the viscoelastic polyurethane foam. The calculated total water content is calculated as the total amount of DI (deionized) water added to the formulation plus the amount of water added to the formulation as part of the preformed aqueous polymer dispersant. For example, the calculated total water content may be from 0.5 wt. % to 1.6 wt. %, 0.5 wt. % to 1.5 wt. %, and/or 1.0 wt. % to 1.5 wt. %.

Exemplary aqueous polymer dispersants are sold as TAMOL™ and OROTAN™, products, available from The Dow Chemical Company, and BYK and DISPERBYK products, available from BYK GmbH, and Rhodaline® products, available from Rhodia Group, and Coadis™ products, available from Arkema, and Hydropalat® products, available from BASF.

Coated Flexible Open-Cell Polyurethane Foam Structure

The coated flexible open-cell polyurethane foam structure may be useful in a variety of packaging applications, comfort applications (such as mattresses—including mattress toppers, pillows, furniture, seat cushions, etc.), shock absorber applications (such as bumper pads, sport and medical equipment, helmet liners, etc.), noise and/or vibration dampening applications (such as earplugs, automobile panels, etc.), and filtration applications (such as vacuum air filters, gutter guards for protecting rain gutter/rain catcher against debris such as plant leaves and melting snow).

The flexible open-cell polyurethane foam for forming the coated flexible open-cell polyurethane foam structure may be prepared in a slabstock process (e.g., as free rise foam), a molding process (such as in a box foaming process), or any other process known in the art. The flexible heat conductive material may be added to the flexible open-cell polyurethane foam after it has been formed. In a slabstock process, the components for forming the flexible open-cell polyurethane foam (e.g., and not the components for forming the flexible heat conductive material) may be mixed and poured into a trough or other region where the formulation reacts, expands freely in at least one direction, and cures. Slabstock processes are generally operated continuously at commercial scales. In a molding process, the components for forming the foam may be mixed and poured into a mold/box (heated or non-heated) where the formulation reacts, expands without the mold in at least one direction, and cures. In a molding process, the formulation can also react, and expand inside a mold that can be closed so that the formulation contacts the mold on all sides (with vent hole or holes on at least one side of a mold), and then cures.

The coated flexible open-cell polyurethane foam structure may be prepared at initial ambient conditions (i.e., room temperature ranging from 20° C. to 25° C. and standard atmospheric pressure of approximately 1 atm). For example, the flexible open-cell polyurethane foam may include an acid polymer and/or an acid-modified polyolefin polymer (e.g., a polymer that has a melting point above 100° C.) without requiring heating or application of pressure to the isocyanate-reactive component. Foaming at pressure below atmospheric condition can also be done, to reduce foam density and soften the foam. Foaming at pressure above atmospheric condition can be done, to increase foam density and therefore the foam load bearing as measured by indentation force deflection (IFD). In a molding processing, the flexible open-cell polyurethane foam may be prepared at initial mold temperature above ambient condition, e.g., 50° C. and above. Overpacking of mold, i.e. filling the mold with extra foaming material, can be done to increase foam density.

The calculated total water content for the reaction system used to form the flexible open-cell polyurethane foam (excluding the water content of the coating) may be less than 5 wt. %, less than 3 wt. %, less than 2.0 wt. %, and/or less than 1.6 wt. %, based on the total weight of the reaction system for forming the flexible open-cell polyurethane foam. The calculated total water content is calculated as the total amount of DI (deionized water) added to the formulation plus the amount of water added to the formulation as part of the preformed aqueous polymer dispersion. For example, the calculated total water content may be from 0.5 wt. % to 1.6 wt. %, 0.5 wt. % to 1.5 wt. %, and/or 1.0 wt. % to 1.5 wt. %.

The resultant flexible open-cell polyurethane foam may exhibit improved wicking effect and/or improved moisture/heat management. With respect to moisture and heat management of a resultant foam, e.g., with respect to a viscoelastic polyurethane foam mattress or pillow, a good wicking effect may enable sweat to move quickly away from a user's skin. The key aspects of human body to maintain the comfort temperature are through moisture vapor by sweating. Sweating is the body's mechanism of keeping itself cool. Good wicking effect may enable the body to remain dry and cool so as providing increased comfort. The good wicking effect may also provide the sweat/water with more surface area to evaporate from. Said in another way, as the sweat/water is dispersed over a greater area it may evaporate more rapidly than when the water is pooled together over a small surface area. Further, good moisture permeability may enable moisture to leave a user's skin and enable natural moisture vapor to bring heat away from the user's skin. The wicking properties may enhance the properties of the coated flexible open-cell polyurethane foam structure.

For example, the flexible open-cell polyurethane foam may exhibit a visually observable wicking height (e.g., on a sample of the flexible open-cell polyurethane foam having the dimensions of 1.0 inch×0.5 inch×2.0 inch, when an edge of the sample is submersed in 5.0 mm of dyed water) that is greater than a visually observable wicking height of a sample of a different flexible open-cell polyurethane foam (which sample has the same dimensions) that is prepared using the same isocyanate-component, the same calculated total water content, and the same isocyanate-reactive component, except that the preformed aqueous polymer dispersion is excluded. For example, the wicking height may be greater by a factor of at least 3 (e.g., may be 3 to 10 times greater and/or 3.5 to 5.5 times greater). Due to the wicking properties, the coating solution may more easily be wicked into the foam, thus taking less total time for all the solution to flatten out into a uniform coating layer thereon.

The flexible open-cell polyurethane foam may exhibit a visually observed wicking time (using a sample of the flexible open-cell polyurethane foam), when three drops of dyed water are placed on a surface of the sample, that is less than a visually observed wicking time using a sample of a different flexible open-cell polyurethane foam that is prepared using the same isocyanate-component, the same calculated total water content, and the same isocyanate-reactive component, except that the preformed aqueous polymer dispersion is excluded. As would be understood by a person of ordinary skill in the art, the compared samples may have a same thickness/depth, but the length and width of the samples are not dependent on the results. The wicking time is visually observed as the time at which it takes for three drops of dyed water to disappear (i.e., be absorbed by the foam) away from the surface of the samples. The wicking time may be decreased by at least 30 seconds so as to be significantly quicker when the preformed aqueous polymer dispersion is used. For example, the wicking time may be less than 5 seconds for the polyurethane foam prepared using the preformed aqueous polymer dispersion (e.g., less than 5 seconds but greater than half a second).

The flexible open-cell polyurethane foam may exhibit improved water vapor permeability, e.g., as measured according to ASTM E96/E96M (and optionally in view of ASTM E2321-03). For example, the water vapor permeability may be improved by at least 5% (e.g., from 5% to 20%) for the polyurethane foam prepared using the preformed aqueous polymer dispersion.

The viscoelastic polyurethane foam may exhibit a Shore 00 hardness of 30 or less and/or may be greater than 3.

As would be understood by a person of ordinary skill in the art, the above comparison of two different foams refers to foams prepared using the same process conditions, same equipment, and the same formulations, except for the exclusion of the preformed aqueous polymer dispersion and/or preformed aqueous polymer dispersant and the increased water content so as to account for excluding the preformed aqueous polymer dispersion in the comparative example.

Flexible Heat Conductive Material

As will be discussed more fully herein, for the various embodiments provided herein the flexible heat conductive material can be formed from a variety of materials. For example, the flexible heat conductive material can be an encapsulated phase change material. For the various embodiments, the phase change material of the flexible heat conductive material may be part of a phase change material based coating having an aqueous composition (such as a latex binder) such that the phase change material based coating is capable of penetrating into the foam material. Further, the use of highly water wicking polyurethane foam forming compositions may be beneficial in obtaining a breathable foam as is the combined use of such foams with the phase change material based coating, e.g., for use in bedding mattresses and mattress top layers ("toppers"). For the various embodiments, the encapsulated phase change material has a latent heat of transition of 80 to 300 joules per gram of the flexible heat conductive material.

In exemplary embodiments, the flexible heat conductive material may include from 5 wt. % to 95 wt. % (e.g., 10 wt. % to 90 wt. %, 20 wt. % to 70 wt. %, 20 wt. % to 50 wt. %, 20 wt. % to 40 wt. %, etc.) of one or more phase change materials (PCMs), based on a total weight of the components for forming the flexible heat conductive material (i.e., total weight of the flexible heat conductive material). In exemplary embodiments, the flexible heat conductive material may include from 5 wt. % to 95 wt. % (e.g., 10 wt. % to 90 wt. %, 10 wt. % to 50 wt. %, 10 wt. % to 30 wt. %, 10 wt. % to 25 wt. %, 20 wt. % to 90 wt. %, 30 wt. % to 80 wt. %, 40 wt. % to 80 wt. %, 50 wt. % to 70 wt. %, etc.) of one or more aqueous polymer emulsions, based on the total weight of the flexible heat conductive material. The amount of the one or more aqueous polymer emulsions used may depend on the amounts of other additives used in the flexible heat conductive material.

In exemplary embodiments, with respect to additives, the flexible heat conductive material may include from 0 wt. % to 30 wt. % (e.g., 1 wt. % to 20 wt. %, 3 wt. % to 15 wt. %, 5 wt. % to 10 wt. %, etc.) of one or more surfactants (optional component), based on a total weight of the coating solution. The surfactant may be a silicone surfactant. The flexible heat conductive material may include from 0 wt. % to 30 wt. % (1 wt. % to 20 wt. %, 1 wt. % to 10 wt. %, 1 wt. % to 5 wt. %, 1 wt. % to 3 wt. %, etc.), based on a total weight of the coating solution, of one or more silicas. The silica may be fumed silica.

The flexible heat conductive material may include from 0 wt. % to 90 wt. % (e.g, 1 wt. % to 80 wt. %, 10 wt. % to 70 wt. %, 20 wt. % to 70 wt. %, 30 wt. % to 70 wt. %, 40 wt. % to 60 wt. %, 45 wt. % to 55 wt. %, etc.), based on a total weight of the coating solution, of water. The surfactant and/or silica may be pre-blended in water, e.g., such that the weight of the surfactant/silica may include from 5 wt. % to 90 wt. % (e.g., from 20 wt. % to 80 wt. %, 20 wt. % to 70 wt. %, 30 wt. % to 60 wt. %, 45 wt. % to 55 wt. %, etc.) of water.

The flexible heat conductive material may include from 0 wt. % to 30 wt. % (1 wt. % to 20 wt. %, 1 wt. % to 10 wt. %, 1 wt. % to 5 wt. %, 1 wt. % to 3 wt. %, etc.), based on a total weight of the coating solution, of a rheology modifier. For example, the rheology modifier may be an ethylene oxide urethane, propylene oxide urethane, and/or butylene oxide urethane-based material.

The flexible heat conductive material may include from 0 wt. % to 30 wt. % (5 wt. % to 30 wt. %, 10 wt. % to 25 wt. %, 10 wt. % to 20 wt. %, etc.), based on a total weight of the flexible heat conductive material, of a glycol. For example, the glycol may have a number average molecular weight from 150 to 1000 g/mol (e.g., 150 g/mol to 800 g/mol, 150 g/mol to 600 g/mol, 200 g/mol to 500 g/mol, 300 g/mol to 500 g/mol, etc.). The glycol may be a polyethylene glycol or polypropylene glycol.

The phase change material is a substance that changes phase at a temperature which aids in keeping a human body cool, i.e., at less than human skin temperature, absorbing heat from the body in the latent heat associated with the phase change. A PCM's latent heat storage may be achieved through liquid-solid, solid-liquid, solid-gas, and/or liquid-gas phase change. In exemplary embodiments, the phase change material in the flexible heat conductive material undergoes a solid-liquid phase change. The flexible heat conductive material may include an organic PCM and/or an inorganic PCM. In exemplary embodiments, the PCM may be encapsulated, such that the PCM material may be subject to phase change within an enclosed area after the flexible heat conductive material is applied to the foam. For example, the encapsulated PCM may include a core material, which includes one or more PCMs and an outer shell or capsule wall. The capsule wall contains the PCM, so regardless of whether the PCM is in the liquid or solid state, the capsule itself may remain as a solid particle or gel particle containing (e.g., completely enclosing) the core material. The capsule wall may include an inert polymer. Encapsulation (e.g., microencapsulation) of the PCM may be achieved by methods such as spray drying, centrifugal, and fluidized beds. Exemplary methods for encapsulation are discussed in, e.g., International Publication No. WO 2010/042566.

The capsule wall may be formed of, e.g., a polyacrylate, gelatin, polyurethane, polyurea, urea-formaldehyde, urea-resorcinol-formaldehyde, and/or melamine formaldehyde. The capsule wall may be formed around the one or more PCMs before forming the flexible heat conductive material, i.e., the flexible heat conductive material includes a preformed encapsulated PCM. The encapsulated PCM may have a total PCM content (including one or more PCMs) from 50 wt. % to 99 wt. % (e.g., 60 wt. % to 99 wt. %, 70 wt. % to 99 wt. %, 80 wt. % to 98 wt. %, and/or 85 wt. % to 95 wt. %), based on a total weight of the encapsulated PCM. The encapsulated PCM may have a mean particle size from 5 microns to 100 microns for dry powder. The encapsulated PCM in wet cake form may have a mean particle size from 1 micron to 20 microns. For example, encapsulated PCMs (e.g., in the form of microcapsules) are available from Microtek Laboratories, Inc. under their Nextek®, Microtek® and Micronal® lines of products, and Encapsys LLC under their EnFinit™ line of products.

The core material, i.e., PCM, may be selected from materials that are most often used in applications for regulation of human body temperatures. For example, the core material (which may include one or more PCMs) may have a melting temperature from 0 to 50° C. and/or from 10 to 40° C. The PCM may be a paraffin-wax or a fatty acid ester, which absorbs and releases heat in order to maintain a particular temperature. For example, the PCM may be a paraffin (e.g., linear paraffin or linear alkane) that includes from 14 to 28 carbon atoms and/or from 16 to 21 carbon atoms. The PCM may be a fatty acid or fatty acid ester, either of which can be saturated or unsaturated. The PCM may be a caprilic acid, camphenilone, glycerin, lactic acid, methyl palmitate, or polyethylene oxide derivatives (including polyethylene glycol such as ones with 600 to 1000 g/mol number average molecular weight), selected from ones that have melting points in the range relevant for the human body (e.g., 0 to 50° C. and/or from 10 to 40° C.). The PCM may be inorganic salts, particularly salt hydrates, e.g., $NaCl.Na_2SO_4.10H_2O$, $Na_2SO_4.10H_2O$, and others.

The encapsulated PCM (e.g., the preformed encapsulated PCM) may be added to the aqueous composition to form the flexible heat conductive material. The aqueous composition may be an aqueous emulsion polymer, e.g., the aqueous composition includes water and at least one emulsion polymer. The aqueous emulsion polymer may be preformed, formed in the presence of the preformed encapsulated PCM, and/or formed in the presence of the materials for forming the encapsulated PCM.

Exemplary aqueous compositions include: PRIMAL™ brand emulsions available from The Dow Chemical Company, RHOPLEX™ brand acrylic emulsions available from The Dow Chemical Company, and HYDRHOLAC™ brand aqueous dispersion polymers available from The Dow Chemical Company. Water may account for 10 wt. % to 99 wt. % of a total weight of the aqueous composition. Known techniques may be used for preparation of the aqueous emulsion polymer and examples include emulsion polymerization that starts with an emulsion incorporating water, polymer (such as monomer), and optionally a surfactant. Exemplary, aqueous coating compositions are discussed in European Patent No. EP 1 422 276 B 1 (also available as U.S. Patent Publication No. 2004/0102568), which is incorporated herein by reference.

In exemplary embodiments, the aqueous composition includes (or consists essentially of) an aqueous acrylic emulsion polymer containing, as copolymerized units, from 50% to 99.75% by weight, based on dry polymer weight, monoethylenically-unsaturated nonionic (meth)acrylic monomer including esters, amides, and nitriles of (meth) acrylic acid, such as, e.g., (meth)acrylic ester monomer including methyl acrylate, ethyl acrylate, butyl acrylate, 2-ethylhexyl acrylate, decyl acrylate, lauryl acrylate, stearyl acrylate, methyl methacrylate, butyl methacrylate, hydroxyethyl methacrylate, hydroxypropyl methacrylate; urieido (meth)acrylate; (meth)acrylonitrile and (meth)acrylamide. The use of the term "(meth)" followed by another term such as acrylate, acrylonitrile, or acrylamide, as used throughout the disclosure, refers to both acrylate, acrylonitrile, or acrylamide and methacrylate, methacrylonitrile, and methacrylamide, respectively. By "nonionic monomer" herein is meant that the copolymerized monomer residue does not bear an ionic charge between pH=1-14.

For example, the aqueous composition includes (or consists essentially of) an aqueous emulsion polymer containing, as copolymerized units, from 0.25% to 10% by weight, based on dry polymer weight, monoethylenically-unsaturated acid monomer such as, for example, acrylic acid, methacrylic acid, crotonic acid, itaconic acid, sulfoethyl methacrylate, phosphoethyl monobutyl methacrylate, fumaric acid, maleic acid, monomethyl itaconate, monomethyl fumarate, fumarate, and maleic anhydride. Preferably, the emulsion polymer contains, as copolymerized units, from 0.3% to 2.5% by weight, based on dry polymer weight, (meth)acrylic acid.

For example, the aqueous composition includes (or consists essentially of) an aqueous emulsion polymer containing, as copolymerized units, from 0 to 60% by weight, based on dry polymer weight, of optional monomers which are neither nonionic monoethylenically-unsaturated nonionic (meth)acrylic monomers nor monoethylenically-unsaturated acid monomers. Optional monomers include, for example, styrene or alkyl-substituted styrenes; butadiene; aminoalkyl(meth)acrylate, N-alkyl aminoalkyl(meth)acrylate, N,N-dialkyl aminoalkyl(meth)acrylate; vinyl acetate, vinyl propionate, or other vinyl esters; vinyl monomers such as vinyl chloride, vinylidene chloride, and N-vinyl pyrollidone; allyl methacrylate, vinyl toluene, vinyl benzophenone, diallyl phthalate, 1,3-butylene glycol dimethacrylate, 1,6-hexanedioldiacrylate, and divinyl benzene.

The emulsion polymer of the aqueous emulsion polymer may substantially uncrosslinked, when it is applied to the foam as the flexible heat conductive material, although low levels of deliberate or adventitious crosslinking can be present. When low levels of precrosslinking or gel content are desired low levels of optional nonionic multi-ethylenically unsaturated monomers such as, e.g., 0.1%-5% by weight based on the dry polymer weight, can be used. It is important, however, that the quality of the film formation is not materially impaired.

Exemplary surfactants may be used in the aqueous emulsion polymer, such as, e.g., anionic and/or nonionic emulsifiers such as, e.g., alkali metal or ammonium salts of alkyl, aryl, or alkylaryl sulfates, sulfonates or phosphates; alkyl sulfonic acids; sulfosuccinate salts; fatty acids; ethylenically unsaturated surfactant monomers; and ethoxylated alcohols or phenols. Polymerizable surfactants can also be used. Preferred polymerizable surfactant monomers are nonylphenoxy propenyl polyethoxylated sulphate (for example as Hitenol from Dai-ichi Corp); sodium alkyl allyl sulphosuccinate (for example as Trem LF-40 from Henkel Corp); ammonium di-(tricyclo(5.2.1.0 2,6)dec-3-en-(8 or 9)oxyethyl)sulfosuccinate; and ammonium di-(tricyclo(5.2.1.0 2,6)dec-3-en-(8 or 9)sulfosuccinate. Additionally, the ammonium and metal salts of unsaturated $C_6$ to $C_{30}$ organic acids can be used, alone or in combination with the above surfactants. Examples of these acids are: alpha methyl cinnamic acid, alpha phenyl cinnamic acid, oleic acid, lineolic acid (as described in U.S. Pat. No. 5,362,832), rincinoleic acid, the unsaturated fraction of Tall oil rosin and fatty acids, disproportionated rosin acid, soybean oil fatty acids, olive oil fatty acids, sunflower oil fatty acids, linseed oil fatty acids, safflower oil fatty acids, sorbitan mono-oleate, abietic acid, poly(oxyethylene) sorbitol sesquioleate, and Empol 1010 Dimer Acid. Suitable polymerizable surfactant monomers also include, for example, maleate derivatives (as described in U.S. Pat. No. 4,246,387), and allyl derivatives of alkyl phenol ethoxylates (as described in JP-62227435). The amount of surfactant used may be from 0.1% to 25% by weight, based on the total weight of polymer. The surfactant may be pre-blended with water.

A low volatile organic compound (VOC) content coating may be sought for use with foams. The low VOC coating composition can contain coalescing agents which are not VOCS. A coalescing agent is a compound that is added to a water-borne emulsion polymer, paint or coating and which reduces the minimum film forming temperature (MFFf) of the emulsion polymer, paint or coating by at least 1° C. The MFFf is measured using ASTM test method 02354. Examples of a coalescing aid which is not a VOC include a plasticizer, low molecular weight polymer, and surfactants. That is, a non-VOC coalescing agent is a coalescing agent which has a boiling point above 280° C. at atmospheric pressure.

Typical methods of paint or coating preparation can introduce adventitious VOCs from the emulsion polymer, biocides, defoamers, soaps, dispersants, and thickeners. These typically account for 0.1% VOC by weight based on the total weight of the coating composition. Additional methods such as steam stripping and choice of low VOC containing additives like biocides, defoamers, soaps, dispersants, and thickeners, can be used to further reduce the paint or coating to less than 0.01% VOC by weight based on the total weight of the coating composition.

The flexible heat conductive material may be applied to a foam that has a straight, flat surface. The flexible heat conductive material may also be applied to curved surfaces, (e.g., contour-cut pillows), more complicated topology surfaces (e.g., the so-called "egg crate" foam pads, also known as convoluted foam sheets; another example is a wavy pattern) that are known in the foam and mattress industry. The flexible heat conductive material may be applied directly on a foam surface, e.g., may be spray coated and/or poured onto the foam surface. The flexible heat conductive material may be allowed to spread on its own or the spreading may be assisted with the use of tools such as a wooden or metal stick or rod, or with the use of an air knife. Curtain coating instruments may be used as well, and the foam can be moved, with the assistance of a conveyor belt, through the curtain of coating liquid. Roll-to-roll coatings of various types can be used as well. In cases where flexible heat conductive material is spray coated or allowed to spread on the foam on its own or the spreading is assisted or a curtain coating instrument is used, then a removable mask may be used to leave certain parts of the surface uncoated, and after coating the mask can be removed to reach the desired coating pattern.

The flexible heat conductive material can also be a gel. For the various embodiments, gels can be made from polyurethanes; rubbers swelled with diluents (also known as extenders), such as mineral oil; silicone elastomers; although various other polymers can be made into gels. Polyurethane gels are described for example in U.S. patent application publication 2017/0166681 A1. Rubbers can be for example natural rubber or styrenic block copolymer rubbers such as SB rubber, SBS, SEBS, SIBS, SEPS, SEEPS, and various others, each of which can be swelled using diluents, most commonly mineral oil. Such rubbers swelled with diluents can be found for example in U.S. Pat. No. 5,618,882. In forming the coated flexible open-cell polyurethane foam structure, the gel used to form the flexible heat conductive material can either be embedded into the flexible open-cell polyurethane foam or the flexible open-cell polyurethane foam can be formed around the structure.

The flexible heat conductive material can also be a metal. Examples of suitable metals include copper and aluminum, among others. As used herein, metal not only includes elemental metals, such as copper and aluminum, but also metal alloys that include copper such as brass and bronze. Other examples of suitable metals include but are not limited to steel, nickel, silver, gold, platinum, and metal alloys that include, but are not limited to, any of the foregoing metals. Also, to further enhance removing heat away from the human body, heat pipes such as used in cooling computer processors can be used, where the metal or material used as the encasing can be any of the metals mentioned previously or a polymeric material, and where phase change materials such as water or organic solvents are encased inside. In forming the coated flexible open-cell polyurethane foam structure, the metal used to form the flexible heat conductive material can be in the form of wire that is woven or braided into a flexible structure. Such a structure can either be embedded into the flexible open-cell polyurethane foam or the flexible open-cell polyurethane foam can be formed around the structure.

All parts and percentages are by weight unless otherwise indicated. All molecular weight data is based on number average molecular weight, unless indicated otherwise.

EXAMPLES

Materials

The Examples use the following materials.

Open-cell viscoelastic polyurethane foam used as the source of properties inputted into the computer model for the present examples is the same type as Example 4 seen in Table 3 of U.S. Patent Application publication 2017/0362375 A1.

The coating formulation for the present Examples uses a phase change material (PCM) with polyethylene glycol and acrylic latex based binders to form a water-based coating. The phase change material is Microtek 28D (Microtek Laboratories, Inc.), which is an encapsulated paraffinic wax material having a phase change temperature of 28° C. The target loading of the Microtek 28D for the present Examples is 0.18 g/inch$^2$ to achieve a latent heat of 33 J/inch$^2$. Weight fraction of the PCM in the coating is about 48%. The physical properties of the PCM coating and its constituent materials are summarized in Table 1.

TABLE 1

Physical Properties of PCM coating & constituent materials

| Microtek 28D | | |
| --- | --- | --- |
| Density | 900 | kg/m$^3$ |
| Heat Capacity | 8.372 | J/g · K |
| Latent Heat | 184 | J/g |
| Thermal Conductivity | 0.22 | W/m · K |
| Binder Properties | | |
| Density | 1030 | kg/m$^3$ |
| Heat Capacity | 2.135 | J/g · K |
| Thermal Conductivity | 0.13 | W/m · K |
| PCM-Binder Coating | | |
| Density | 963.12 | kg/m$^3$ |
| Heat Capacity | 5.13 | J/g · K |
| Latent Heat | 88.46 | J/g |
| Thermal Conductivity | 0.18 | W/m · K |

Simulation of Heat Transfer from Human Body

The simulation details are described following Table 4, below. For each of the following examples, the starting temperature and humidity for the open-cell viscoelastic polyurethane foam is 20° C. with 40% relative humidity. The human body is modeled using an elongated ellipse that is 400 mm wide and sinks into the open-cell viscoelastic polyurethane foam 70 mm at the center. The contact arc length, c, between the human body ellipse and the open-cell viscoelastic polyurethane foam is expressed by the following (to within 1% error in this instance):

$$c \approx \frac{\pi}{2}\left(3(a+b) - \sqrt{(3a+b)(a+3b)}\right)$$

where a is the semi-major axis (i.e. half of the major axis length), and b is the semi-minor axis. The value of c is calculated to be 449 mm.

The open-cell viscoelastic polyurethane foam in some instances has a coating coverage fraction of 70% with the remaining 30% of the total coverage fraction being uncoated to allow for the breathable openings. This allowed for a total width of the openings to be 134.7 mm. For the given total width, the following number of gaps are provided when the break split evenly into the following number of gaps: 7 gaps=19.2 mm; 15 gaps=9.0 mm each; 23 gaps split evenly=5.9 mm each; 31 gaps=4.3 mm each. The number-of-gaps to gap-width conversion for other values of coating coverage fractions (for example, 50%, 60% and 90%) follows similar calculations.

The following scenarios are considered:

Comparative Example (C.E.) A=memory foam with no PCM coating

C.E. B=memory foam with PCM coating on 100% of the surface

C.E. C=memory foam with PCM coating on 70% of the surface, with 7 gaps spaced evenly to allow for breathability, each of those gaps being 19.2 mm in width.

C.E. D=memory foam with PCM coating on 70% of the surface, with 15 gaps spaced evenly to allow for breathability, each of those gaps being 9.0 mm in width.

Inventive Example (I.E.) #1=memory foam with PCM coating on 70% of the surface, with 23 gaps spaced evenly to allow for breathability, each of those gaps being 5.9 mm in width.

I.E. #2=memory foam with PCM coating on 70% of the surface, with 31 gaps spaced evenly to allow for breathability, each of those gaps being 4.3 mm in width.

I.E. #3=memory foam with PCM coating on 50% of the surface, with 25 gaps spaced evenly to allow for breathability, each of those gaps being 9.0 mm in width.

I.E. #4=memory foam with PCM coating on 50% of the surface, with 35 gaps spaced evenly to allow for breathability, each of those gaps being 6.4 mm in width.

C.E. E=memory foam with PCM coating on 60% of the surface, with 20 gaps spaced evenly to allow for breathability, each of those gaps being 9.0 mm in width.

C.E. F=memory foam with PCM coating on 90% of the surface, with 5 gaps spaced evenly to allow for breathability, each of those gaps being 9.0 mm in width.

C.E. G=memory foam with PCM coating on 90% of the surface, with 10 gaps spaced evenly to allow for breathability, each of those gaps being 4.5 mm in width.

In all cases, the materials with PCM coating (C.E. B to G and I.E. #1 to #4) start with lower temperatures (see Tables 2 and 3). As the body heats up the surface, by 120 min C.E. B to G are as warm as or warmer than C.E. A (the bare foam, with no coating), or else cooler than C.E. A at 120 min. by less than the 0.11° C. threshold for detecting a decrease in temperature, as stated in the Stevens & Choo reference as cited by Jones (Stevens, J. C., & Choo, K. K. (1998). Temperature sensitivity of the body surface over the life span. *Somatosensory & Motor Research*, 15, 13-28. Cited by Jones, L. (2009). Thermal Touch. *Scholarpedia*, 4(5):7955. http://www.scholarpedia.org/article/Thermal_touch). However, for I.E. #1 to #4, the temperature consistently stays below that of C.E. A (and also C.E. B to G) and is cooler by more than the 0.11° C. threshold. So, having many breathable uncoated spacers, (i.e., uncoated gaps that are narrow) allows for improved cooling performance.

Figure 5:
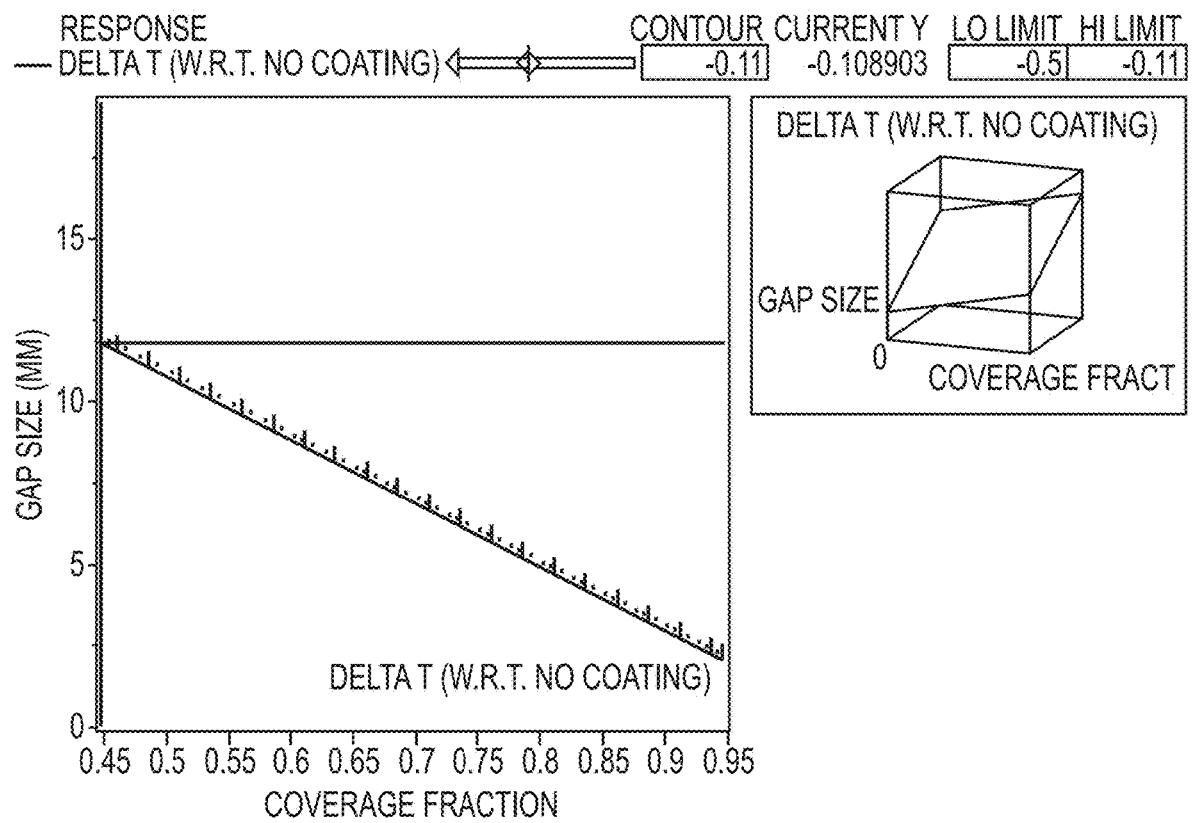
FIG. 5 is a graph showing the fit to the data from both the inventive and comparative examples that was analyzed to determine Formula I and II for calculating the gap width of the present disclosure.

Data from both the inventive and comparative examples were further analyzed to determine the range of gap size that is inventive in the sense that the PCM coated foam will be cooler than the C.E. A (no PCM coating) foam by the 0.11° C. threshold. FIG. 5 shows the result of a contour plot prepared from linear fit using the coating coverage fraction and the gap size as the input variables, and the difference in maximum temperature reached for a PCM coated foam versus the C.E. A foam (no PCM coating). The curve fitting was done without including I.E. #2 which turned out to be especially cooling. The resulting curve fit still was able to predict that I.E. #2 would have cooling of greater than 0.11° C. relative to the C.E. A foam. The contour line is the combination of the gap size and coating coverage fraction where the PCM coated foam has a maximum temperature at 120 min that is 0.11° C. lower than the C.E. A foam (no PCM coating). So, the inventive range is the combination of the gap size and coating coverage fraction that is below the contour line in FIG. 5. In other words, the size of the breathable opening ("gap-size"), for a given PCM coating coverage fraction ("cov"), is less than a certain level, and follows the following inequality:

gap-size [in mm]≤−0.196*cov [in %]+20.6

The validity of this inequality expression is validated in Table 4 in the final two columns that compare the simulation results (whether drop in T @ 120 min compared with C.E. #A is greater than 0.11° C.) against the prediction based on the inequality expression.

TABLE 2

Temperature versus Time Values for Comparative Examples A-D and Inventive Examples 1 and 2.

| time (min) | C.E. A No PCM (° C.) | C.E. B 100% Coverage (° C.) | C.E. C 70% Coverage + 7 Gaps (° C.) | C.E. D 70% Coverage + 15 Gaps (° C.) | I.E. #1 70% Coverage + 23 Gaps (° C.) | I.E. #2 70% Coverage + 31 Gaps (° C.) |
|---|---|---|---|---|---|---|
| 15 | 31.194 | 28.211 | 30.285 | 29.558 | 29.239 | 28.983 |
| 30 | 32.116 | 30.081 | 31.433 | 31.007 | 30.754 | 30.622 |
| 45 | 32.598 | 31.195 | 32.068 | 31.881 | 31.720 | 31.603 |
| 60 | 32.916 | 32.020 | 32.477 | 32.416 | 32.344 | 32.270 |
| 75 | 33.239 | 32.616 | 32.779 | 32.795 | 32.765 | 32.711 |
| 90 | 33.576 | 33.164 | 33.256 | 33.300 | 33.189 | 33.021 |
| 105 | 33.887 | 33.682 | 33.772 | 33.752 | 33.640 | 33.377 |
| 120 | 34.172 | 34.152 | 34.233 | 34.159 | 34.026 | 33.746 |

TABLE 3

Temperature versus Time Values for Comparative Examples E-G and Inventive Examples 3 and 4.

| time (min) | I.E. #3 50% Coverage + 25Gaps (° C.) | I.E. #4 50% Coverage + 35 Gaps (° C.) | C.E. E 60% Coverage + 20 Gaps (° C.) | C.E. F 90% Coverage + 5 Gaps (° C.) | C.E. G 90% Coverage + 10 Gaps (° C.) |
|---|---|---|---|---|---|
| 15 | 29.759 | 29.599 | 29.693 | 29.404 | 29.173 |
| 30 | 31.203 | 31.116 | 31.057 | 30.827 | 30.690 |
| 45 | 32.026 | 31.992 | 31.930 | 31.739 | 31.622 |
| 60 | 32.557 | 32.535 | 32.483 | 32.338 | 32.240 |
| 75 | 32.903 | 32.893 | 32.841 | 32.726 | 32.623 |
| 90 | 33.300 | 33.242 | 33.293 | 33.162 | 33.104 |
| 105 | 33.693 | 33.621 | 33.713 | 33.655 | 33.619 |
| 120 | 34.038 | 33.953 | 34.097 | 34.122 | 34.091 |

TABLE 4

Simulated Heat Transfer Data for Comparative Examples A-G and Inventive Examples 1-4.

| Simulated Coating Configuration on Foam | coating coverage fraction (%) | gap size (mm) | T at 120 min (° C.) | Change in T @ 120 min compared with C.E. #A (° C.) | Greater than a 0.11° C. drop? | Curve Fit Predicts Greater than a 0.11° C. drop? |
|---|---|---|---|---|---|---|
| C.E. A (No PCM) | 0 | 449 | 34.172 | 0.000 | no | no |
| C.E. B (100% Coverage) | 100 | n/a | 34.152 | −0.020 | no | no |
| C.E. C (70% Coverage + 7 Gaps) | 70 | 19.2 | 34.233 | 0.061 | no | no |
| C.E. D (70% Coverage + 15 Gaps) | 70 | 9.0 | 34.159 | −0.013 | no | no |
| I.E. #1 (70% Coverage + 23 Gaps) | 70 | 5.9 | 34.026 | −0.146 | YES | YES |
| I.E. #2 (70% Coverage + 31 Gaps) | 70 | 4.3 | 33.746 | −0.426 | YES | YES |
| I.E. #3 (50% Coverage + 25Gaps) | 50 | 9.0 | 34.038 | −0.134 | YES | YES |

TABLE 4-continued

Simulated Heat Transfer Data for Comparative Examples A-G and Inventive Examples 1-4.

| Simulated Coating Configuration on Foam | coating coverage fraction (%) | gap size (mm) | T at 120 min (° C.) | Change in T @ 120 min compared with C.E. #A (° C.) | Greater than a 0.11° C. drop? | Curve Fit Predicts Greater than a 0.11° C. drop? |
|---|---|---|---|---|---|---|
| I.E. #4 (50% Coverage + 35 Gaps) | 50 | 6.4 | 33.953 | −0.219 | YES | YES |
| C.E. E (60% Coverage + 20 Gaps) | 60 | 9.0 | 34.097 | −0.075 | no | no |
| C.E. F (90% Coverage + 5 Gaps) | 90 | 9.0 | 34.122 | −0.050 | no | no |
| C.E. G (90% Coverage + 10 Gaps) | 90 | 4.5 | 34.091 | −0.081 | no | no |

Simulation Details—Model Development

2D Model

Figure 6:
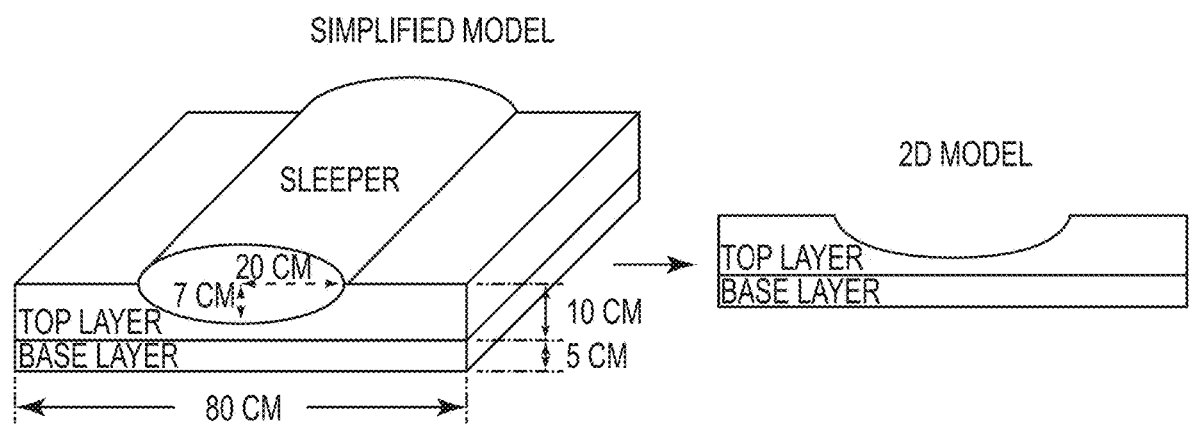
FIG. 6 is a simplified geometry model used for a sleeper and a mattress.

The thermal comfort of a mattress is primarily determined by the temperature and humidity at its boundary with the sleeper. Although mechanical response of the foam is also a factor in material selection, it is not directly simulated in the current model, which is focused on thermal comfort. The complex geometry of the sleeper and the mattress is simplified in the model, as indicated in FIG. 6. The mattress consists of two layers of different foam materials. The top layer is the open-cell viscoelastic polyurethane foam, which provides a soft touch while the base layer is a harder foam to provide enough support. to provide enough support. As an approximation to simplify the simulation, it was assumed that the hard foam layer was incompressible, which is realistic when a hard enough foam layer is used, for example IFD of 30-50 lb-force. Examples of such foams are described on page 9.37 in Herrington R. & Hock K., eds. "Dow Polyurethane Flexible Foams" (The Dow Chemical Company, Midland, Mich. 1997). The sleeper's torso is represented by a cylinder with an elliptical cross section that is 40 cm on the major axis and 14 cm on the minor axis. The top surface of the top layer matches the elliptical shape to mimic the compression caused by the sleeper's weight. The depth of the semi-elliptical area is 70% of the foam height, corresponding to a compression ratio of 70% at the bottom of the contact area in the top layer. The base layer is assumed to have no compression. The top foam layer and base layer are 80 cm wide and 10 cm and 5 cm high respectively, and both dimensions are short compared to the longitudinal dimension (~2 m or more). The 3D assembly can be represented by a 2D model of its cross-section.

The top surface of the mattress is coated with an alternating pattern of the PCM to dissipate heat via phase change. On top of the PCM coating, a thin layer domain is added to mimic a fabric layer to take into account potential impact from bedding sheet.

Principal Phenomena in the 2D Model

The 2D model simulates the principal phenomena that could affect the sleeping comfort of the mattress, including heat transfer, moisture transport and natural convection of air in the foam mattress. The contribution of natural convection to the transport of heat and moisture is also considered. All of these phenomena have been defined for each layer in the mattress model (i.e., foam, PCM coating, and fabric layer) with different material properties. The models for each phenomenon are introduced in the following sections. The model has been implemented using the commercial software package COMSOL Multiphysics® 5.0. COMSOL® is a finite element simulation software which provides built-in interfaces to couple various physics phenomena in a single model to analyze their interactions.

Transport of Water Vapor in the Mattress

The transport of water vapor in the porous foam is simulated using the following equation:

$$\varepsilon_p \frac{\partial c}{\partial t} + \vec{u} \cdot \nabla c = \nabla \cdot (D_e \nabla c) + S \quad (1)$$

where c is the water vapor concentration of the air inside the foam (unit: mol/m³); $\varepsilon_p$ is the foam porosity (unitless); $\vec{u}$ is the convection velocity (unit: m/s); $D_e$ is the effective diffusivity of water vapor (unit: m²/s); S is the source of water vapor inside the foam (S=0 in this study). The effective diffusivity of water vapor within the tortuous porous structure, $D_e$, will be less than the diffusivity of water vapor in free air, $D_F$=2.82×10⁻⁵ m²/s. The 2D model considers the variation of foam porosity, $\varepsilon_p$, due to compression, which also affects the effective diffusivity of water vapor inside the mattress. The effective diffusivity of water vapor has been measured at different compression ratios, and a curve fitting equation of the measurements is used to determine $D_e$. The natural convection equations used to determine the convection velocity within the foam, $\vec{u}$, are described below.

Transport of Heat in the Mattress

The heat transfer throughout the mattress is simulated using the energy balance equation:

$$(\rho C_p)_{eff} \frac{\partial T}{\partial t} + \rho_{air} C_{p,air} \vec{u} \cdot \nabla T = \nabla \cdot (k_{eff} \nabla T) + Q \quad (2)$$

where T is temperature in the foam (unit: K); $\rho a$, is the density of air (unit: kg/m³); $C_{p,air}$ is the specific heat capacity of air at constant pressure (unit: J/(kg·K)); $(\rho C_p)_{eff}$ is the effective volumetric heat capacity of the foam at constant pressure; $k_{eff}$ is the effective thermal conductivity (unit: W/(m·K)); Q is the heat source in the mattress (Q=0 in this study). The effective volumetric heat capacity, $(\rho C_p)_{eff}$, is defined as:

$$(\rho C_p)_{eff} = \varepsilon_p \rho_{air} C_{p,air} + (1-\varepsilon_p) \rho_{PU} C_{p,PU} \quad (3)$$

where $\rho_{PU}$ and $C_{p,PU}$ are the density and specific heat capacity of monolithic polyurethane ("PU"), respectively. The effective thermal conductivity $k_{eff}$ used in this work is measured by ASTM method C518 on the Lasercomp thermal conductivity equipment using the open-cell viscoelastic polyurethane foam.

Natural Convection of Air in the Mattress

Natural convection in the foam is modeled based on the continuity equation and the Brinkman equation for momentum balance in a porous media as follows:

$$\nabla \cdot \vec{u} = 0 \quad (4)$$

$$\frac{\rho_{air}}{\varepsilon_p} \frac{\partial \vec{u}}{\partial t} = -\nabla p + \nabla \cdot \left[ \frac{\mu_{air}}{\varepsilon_p} \left( \nabla \vec{u} + (\nabla \vec{u})^T \right) \right] - \frac{\mu_{air}}{\kappa} \vec{u} + \vec{F} \quad (5)$$

where p is the hydrostatic pressure (unit: Pa); $\mu_{air}$ is the dynamic viscosity of the air (unit: Pa·s); $\kappa$ is the permeability of the PU foam (unit: m$^2$); $\vec{F}$ is the volumetric force (unit: N/m$^3$). It is assumed that the air in the foam behaves as an incompressible ideal gas, except for an extra volumetric force term added to the momentum equation to account for the thermal expansion of the air as it is heated up. The Boussinesq approximation for small changes in gas density with temperature is applied to the buoyancy force equation to give:

$$\vec{F} = \rho_{air} \vec{g} \alpha_{air} (T - T_{ref}) \quad (6)$$

where $\vec{g}$ is the gravity constant; $\alpha_{air}$ is the coefficient of thermal expansion of air, and $T_{ref}$ is the reference temperature (20° C.).

The physical properties of air and solid (monolithic) PU are listed in Table 5 and Table 6. They are treated as constant within the range of temperature and humidity provided herein. The influence of moisture content and temperature on the air properties (e.g. $\rho_{air}$, $C_{p,air}$, $\mu$) are not considered.

TABLE 5

Physical properties of air (20° C., 1 atm)

| | |
|---|---|
| Density, $\rho_{air}$ | 1.2 kg/m$^3$ |
| Dynamic viscosity, $\mu_{air}$ | 1.8 × 10$^{-5}$ Pa · s |
| Coefficient of thermal expansion, $\alpha_{air}$ | 3.43 × 10$^{-3}$ K$^{-1}$ |
| Specific heat capacity, $C_{p,air}$ | 1005 J/(kg · K) |

TABLE 6

Physical properties of monolithic PU

| | |
|---|---|
| Density, $\rho_{PU}$ | 1150 kg/m$^3$ |
| Specific heat capacity, $C_{p,PU}$ | 1800 J/(kg · K) |

Modeling Permeable Phase Change Material (PCM) Coating

Permeable PCM Coating Pattern

PCM coatings dissipate heat in the form of latent heat of phase change, which leads to cooler feel when it contacts human skin. However, a dense layer of PCM coating is typically impermeable and creates a barrier to limit diffusion of moisture away from the interface between the sleeper and the open-cell viscoelastic polyurethane foam. Such a limitation compromises the efficiency of PCM coating to provide an extended comfort due to the accumulation of moisture at the sleeper/foam boundary.

Figure 7:
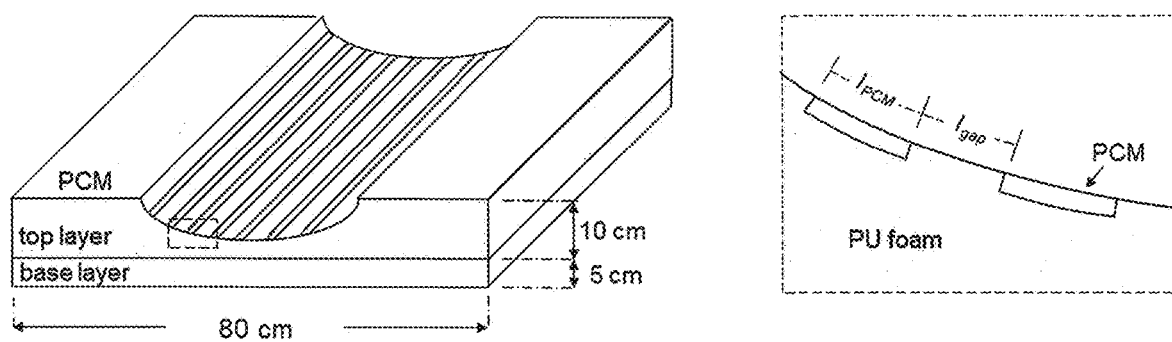
FIG. 7 is an illustration of a geometry model of a coating pattern on flexible open-cell polyurethane foam structure used to model heat and moisture transport through the coated flexible open-cell polyurethane foam structure according to one embodiment of the present disclosure.

One solution to improve the diffusion rate of moisture through the PCM coating layer is to add gaps in the coating so that moisture can transport through these openings in the coating layer. One such pattern of gaps is shown in FIG. 7, where strips of PCM coating are placed alternatively at the mattress/sleeper boundary. The pattern of PCM coating covers a certain percentage of the mattress/sleeper boundary with equal strip width and equal gap distance between adjacent PCM strips.

Figure 8:
FIG. 8 is an illustration of angular coordinates measured from a major axis in polar coordinates with the origin at the center of the ellipse.

The boundary between the foam and the sleeper is assumed to have the form of a semi ellipse. The total arch length of the boundary can be calculated by solving an elliptic integral as follows:

$$L = 2a \int_0^{\pi/2} \sqrt{1 - (1 - b^2/a^2) \sin^2 \beta} \, d\beta \quad (7)$$

Where a and b are the lengths of the semi-major and semi-minor axes, respectively. As shown in FIG. 8, $\beta$ is the angular coordinate measured from the major axis in polar coordinates with the origin at the center of the ellipse. The pattern of the PCM coating can be determined by the number of gaps between PCM strips, $N_{gap}$, and the percentage of the boundary covered by the coating, $\alpha_{PCM}$. The coating pattern is designed as follows:

The number of PCM strips: $N_{PCM} = N_{gap} + 1$ (8)

The arch length of each PCM strips: $l_{pcm} = L \alpha_{PCM} / N_{PCM}$ (9)

The arch length of the gap between adjacent PCM strips: $l_{gap} = L(1 - \alpha_{PCM})/N_{gap}$ (10)

The locations of each of the PCM strips are determined by calculating the angular coordinate at which the boundary segment reaches the required arch length. As shown in FIG. 8, the arch length between point A and point B can be calculated as:

$$L_{AB} = a \int_{\beta_A}^{\beta_B} \sqrt{1 - (1 - b^2/a^2) \sin^2 \beta} \, d\beta \quad (11)$$

Figure 9:
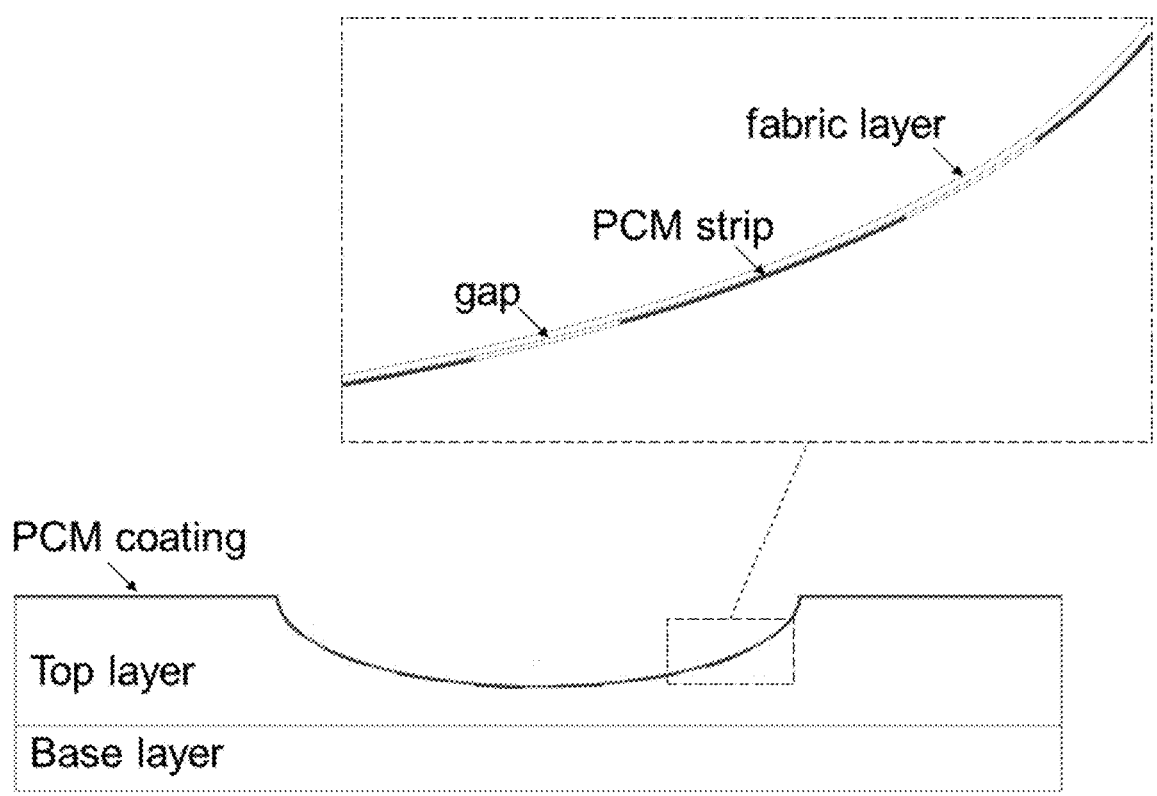
FIG. 9 shows an example of a coating pattern with 70% PCM coverage ratio and 7 gaps according to one embodiment of the present disclosure.
Figure 10:
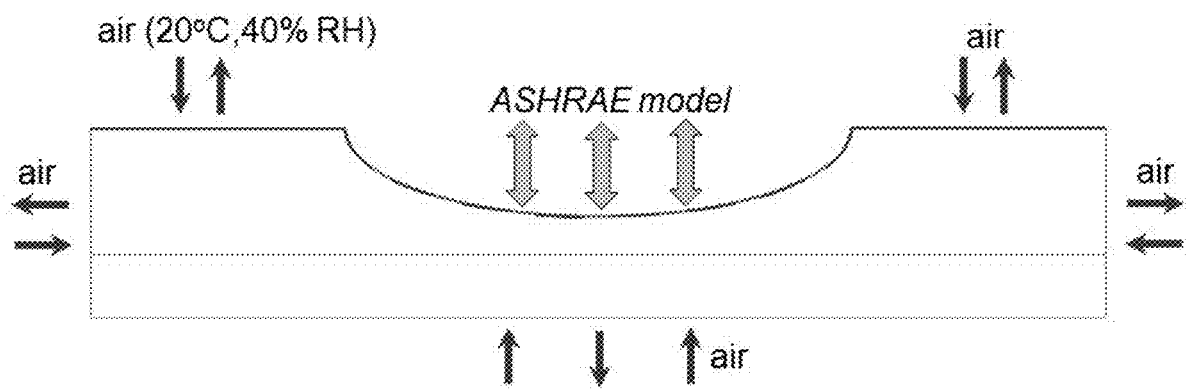
FIG. 10 shows an example of a 2D model for the coating pattern with 70% PCM coverage ratio and 7 gaps seen in FIG. 9.

Once the angular coordinates of each of the partition points on one half of the boundary is determined, their locations on the other half can be determined by symmetry. FIG. 9 shows an example of a coating pattern with 70% PCM coverage ratio and 7 gaps, where FIG. 10 shows an example of the boundary conditions applied to a 2D model for the coating pattern.

Model of Phase Change Material

Phase change material is modeled using the "Heat Transfer with Phase Change" module in Comsol Multiphysics® (Comsol Inc.). In Comsol Multiphysics®, the latent heat associated with phase change is not abruptly added to the energy balance equation once the temperature reaches the phase change temperature, $T_{PC}$. Instead, Comsol Multiphysics® assumes phase change happens within a temperature range between $T_{PC} - \Delta T/2$ and $T_{PC} + \Delta T/2$. Within this temperature interval, the effective properties of the phase change material are determined with a mixture rule of the materials before and after the phase change. The fraction of the unchanged material is represented by a smoothed function $\theta$, which varies from 1 to 0 as temperature changes from $T_{PC} - \Delta T/2$ to $T_{PC} + \Delta T/2$.

The effective density $\rho$ and thermal conductivity $\kappa$ are calculated as:

$$\rho = \theta \rho_0 \pm (1 - \theta) \rho_1 \quad (12)$$

$$\kappa = \theta \kappa_0 + (1 - \theta) \kappa_1 \quad (13)$$

where the subscripts "0" and "1" indicate the material in its original phase or after phase change, respectively.

The apparent specific heat capacity $C_p$ within the temperature interval is calculated as:

$$C_p = \frac{1}{\rho}[\theta \rho_o C_{p,o} + (1-\theta)\rho_1 C_{p,1}] + C_L \quad (14)$$

The second term $C_L$ approximates the latent heat distribution in the temperature interval according to:

$$C_L = \lambda \frac{d\alpha_m}{dT} \quad (15)$$

where $\alpha_m$ is defined as:

$$\alpha_m = \frac{1}{2} \frac{(1-\theta)\rho_1 - \theta \rho_o}{\rho} \quad (16)$$

The total heat released per unit volume during the phase change is equal to the measured total latent heat, $\lambda$, as calculated in Equation 17.

$$\int_{T_{pc}-\frac{\Delta T}{2}}^{T_{pc}+\frac{\Delta T}{2}} C_L dT = \int_{T_{pc}-\frac{\Delta T}{2}}^{T_{pc}+\frac{\Delta T}{2}} \lambda \frac{d\alpha_m}{dT} dT = \lambda \quad (17)$$

Modeling Human Thermoregulation System

As shown in FIG. 10, the 2D model uses different boundary conditions to mimic the ambient environment. At the boundaries that are exposed to ambient air, the temperature and moisture level are specified to be the ambient conditions (i.e., 20° C. with 40% relative humidity), and air is allowed to flow freely into or out of the foam. In addition, at the sleeper/mattress boundary, it is assumed that air only flows along the tangential direction (i.e., it cannot flow into the body). It is assumed that initially the foam mattress is filled with stagnant ambient air (20° C. with 40% relative humidity). The reference pressure is 1 atm.

At the boundary with the sleeper, the sleeper's thermoregulation system constantly tracks the surrounding temperature and moisture level, and adjusts the dissipation of heat and moisture at the human skin to maintain a stable deep body temperature. Therefore, incorporating the thermoregulation system is essential to estimate the heat and moisture transport between the mattress and the sleeper. The current study utilized a model published by the American Society of Heating, Refrigerating, and Air-Conditioning Engineers (aka "ASHRAE model") at the mattress/sleeper boundary to link the human thermoregulation system with the transport of heat and moisture in the mattress.

The ASHRAE model considers the human body as two thermal compartments that represent the skin and the body core. It is assumed that the temperature inside each compartment is uniform (denoted as $t_{sk}$ for skin and $t_{cr}$ for core) and the heat exchange inside the human body can then be treated as the heat transfer between two nodes that represent the skin and core. In general, the neutral temperatures associated with comfort are 34° C. for skin and 37° C. for the body core compartment. The thermoregulation system continuously controls various physiological mechanisms to maintain a stable body core temperature. Equations of energy balance of each compartment can be solved for the temperature in the skin and the core, $t_{sk}$ and $t_{cr}$, as shown in Equation 18 and Equation 19, respectively. The two equations consider the energy balance and heat loss on the basis of unit skin area. Parameters and variables of the two equations are listed in Table 7 and Table 8.

$$(K + \rho_{bl}Q_{bl}c_{p,bl})(t_{cr} - t_{sk}) = C + R + E_{sk} + \frac{\alpha_{sk} mc_{sk}}{A_D} \frac{dt_{sk}}{dt} \quad (18)$$

TABLE 7

Parameters and variables in Equation 18 for the energy balance in skin

| | |
|---|---|
| $Q_{cr,sk} = (K + \rho_{bl}Q_{bl}c_{p,bl})(t_{cr} - t_{sk})$ | heat flux from the core into the skin (unit: W/m²) |
| K | massless thermal conductor, K = 5.28 W/(m² · K) |
| $\rho_{bl}$ | density of blood (1.06 kg/L) |
| $Q_{bl}$ | blood flow in the skin compartment (unit: L/(m² · s)) |
| $C_{p,bl}$ | specific heat of blood (4190 J/(kg · K)). |
| C + R | sensible heat loss (unit: W/m²) |
| $E_{sk}$ | evaporative heat loss (unit: W/m²) |
| $\alpha_{sk}$ | weight fraction of the skin compartment |
| $c_{sk}$ | specific heat of the skin compartment (3500 J/(kg · K)) |
| M | body mass (unit: kg) |
| $A_D$ | total skin area (unit: m²) |

$$M + M_{shiv} = W + q_{res} + (K + \rho_{bl}Q_{bl}c_{p,bl})(t_{cr} - t_{sk}) + \frac{(1 - \alpha_{sk}) mc_{cr}}{A_D} \frac{dt_{cr}}{dt} \quad (19)$$

TABLE 8

Parameters and variables in Equation 19 for the energy balance in core

| | |
|---|---|
| M | rate of metabolic heat production (unit: W/m²) |
| W | rate of mechanical work (unit: W/m²) |
| $q_{res}$ | respiratory heat loss (unit: W/m²) |
| $M_{shiv}$ | heat generated by shivering (unit: W/m²) |
| $c_{cr}$ | specific heat of the core compartment (3500 J/(kg · K)) |

In Equation 19, it is assumed heat is generated in the core compartment, by both human metabolic activity and shivering. The rate of metabolic heat production, M, and the rate of mechanical work, W, (unit: W/m²) both depend on activity level. For a sleeping person, M=40 W/m² and W=0.

The two energy balance equations of the ASHRAE model have been applied as special boundary conditions in the previous 2D model using a special module in Comsol Multiphysics®. At the sleeper/mattress boundary, the ASHRAE model imports the temperature and moisture concentration calculated by the 2D multi-physics model and adjusts the heat dissipation and sweating rate to maintain a stable core temperature. Meanwhile, the ASHRAE model returns the flux of heat and moisture to the 2D model as boundary conditions. The two processes work simultaneously and cooperatively to mimic the interaction between the sleeper and the foam mattress.

The heat flux at the sleeper/mattress boundary is equal to the sensible heat loss from the sleeper's skin, C+R. The sensible heat loss depends on the clothing insulation and the difference between the skin temperature and an effective operative temperature which is equal to the temperature at the sleeper/mattress boundary, $t_f$. The heat flux transferred from the sleeper to the foam, $Q_f$, can be calculated from the following equation:

$$Q_f = C + R = \frac{t_{sk} - t_f}{R_{cl} + 1/(f_{cl}h)} \quad (20)$$

$$h = h_r + h_c \quad (21)$$

where $h_r$ and $h_c$ (unit: W/(m²·K)) are the radiative heat transfer coefficient and convective heat transfer coefficient, respectively. For typical indoor conditions, $h_r$=4.7 W/(m²·K). Previous analysis shows that the air flow rate at the sleeper/mattress boundary is on the order of $10^{-4}$ m/s; $h_c$=5.1 W/(m²·K) when air flow rate is below 0.15 m/S. $R_{cl}$ is the thermal resistance of clothing (unit: m²·K/W); $f_{cl}$ is a clothing area factor that accounts for the actual covered area of clothed body. The current study assumed that the resistance to heat and moisture transfer is very low at the sleeper/mattress boundary and it can represented by those for a sleeper wearing walking shorts and short sleeved shirt. The corresponding clothing parameters are $R_{cl}$=0.0558 m²·K/W and $f_{cl}$=1.1.

As shown in Equation 22, the flux of moisture at the boundary, $S_f$, is related to the evaporative heat loss, $E_{sk}$, assuming that all the moisture evaporated from the skin has been transferred into the mattress.

$$S_f = \frac{E_{sk}}{h_{fg} M_{H_2O}} \quad (22)$$

where $h_{fg}$ is the heat of evaporation of water (2.43×10⁶ J/kg at 30° C.); [12] $M_{H_2O}$ is the molar mass of water (18×10⁻³ kg/mol). The evaporative heat loss, $E_{sk}$, depends on the skin wetness, w, defined as the ratio of $E_{sk}$ to the maximum evaporative heat loss, $E_{max}$, as shown in Equation 23.

$$E_{sk} = w E_{max} \quad (23)$$

The maximum evaporative heat loss, $E_{max}$, depends on the difference between the humidity close to skin and that in the surrounding environment, as shown the following equation:

$$E_{max} = \frac{p_{sk,s} - p_f}{R_{e,cl} + 1/(f_{cl} h_e)} \quad (24)$$

where $p_{sk,s}$ is the water vapor pressure at the skin (unit: kPa), assumed to be the saturated water vapor pressure at skin temperature, $t_{sk}$. $p_f$ is the water vapor pressure at the sleeper/mattress boundary (unit: kPa). $h_e$ is the evaporative heat transfer coefficient (unit: W/(m²·kPa)) and $R_{e,cl}$ a is the evaporative heat transfer resistance of clothing (unit: m²·kPa/W). Equations for calculating $p_{sk,s}$, $h_e$, and $R_{e,cl}$ can be found in the 2013 ASHRAE Handbook, as the ASHRAE Model for Human Thermal Regulation.

The water vapor pressure at the sleeper/mattress boundary, $p_f$, can be calculated from the moisture concentration predicted by the 2D multi-physics model, $c_f$, (unit: mol/m³):

$$p_f = 10^{-3} c_f R T_f \quad (25)$$

where $p_f$ is in kPa; R is the gas constant (R=8.314 J·K⁻¹·mol⁻¹); and $T_f$ (unit: K) is the corresponding temperature predicted by the 2D model at the boundary.

In the 2D combined model, the heat flux, $Q_f$, and the moisture flux, $S_f$, are applied at the sleeper/mattress boundary to represent the heat and moisture transferred from the sleeper into the mattress. The moisture concentration at the sleeper/mattress boundary, $C_f$, and the corresponding temperature at the boundary, $T_f$, are calculated by the 2D multi-physics model and are used as input for the ASHRAE model to calculate the moisture and heat flux at the boundary. Each point on the boundary of the 2D simulation is linked to a copy of the ASHRAE model, which senses the local heat/moisture transfer environment presented by the 2D geometry.

We claim:

1. A coated flexible open-cell polyurethane foam structure, comprising:
   a flexible open-cell polyurethane foam having a first major surface and a second major surface opposite the first major surface; and
   a flexible heat conductive material covering 50 to 70 percent (cov., expressed in %) of a surface area of the first major surface of the flexible open-cell polyurethane foam in a predefined shape to provide gaps exposing the flexible open-cell polyurethane foam between defined edges of the flexible heat conductive material, wherein each gap has a gap width of 4.3 to 9.0 mm for Formula I:

gap width (mm)≤−0.155×cov. (%)+16.75     (Formula I)

wherein a total surface area of the gaps provides 50 to 30 percent of the surface area of the first major surface of the flexible open-cell polyurethane foam and wherein the relationship between the cov. (%) and the gap width, as defined by Formula I, provides a cooling of greater than 0.11° C. relative to a flexible open-cell polyurethane foam structure without the flexible heat conductive material and wherein the flexible heat conductive material contains an encapsulated phase change material having a latent heat of transition of 80 to 300 joules per gram of the flexible heat conductive material.

2. The structure of claim 1, wherein the flexible heat conductive material further comprises a gel.

3. The structure of claim 1, wherein the flexible heat conductive material further comprises a metal.

4. The structure of claim 1, wherein the flexible heat conductive material in the predefined shape have a thickness of 0.1 to 2 millimeter.

5. The structure of claim 1, wherein the predefined shape of the flexible heat conductive material is a single continuous strip on the first major surface of the open-cell viscoelastic polyurethane foam.

6. The structure of claim 5, wherein the single continuous strip on the first major surface of the flexible open-cell polyurethane foam has a serpentine shape.

7. The structure of claim 1, wherein the predefined shape of the flexible heat conductive material further comprises a series of parallel strips on the first major surface of the flexible open-cell polyurethane foam.

8. The structure of claim 1, wherein the gap width for each gap of the gaps has the same value.

9. The structure of claim 1, wherein the gap width for each of the gaps has a different value.

10. The structure of claim 1, wherein at least a portion of the flexible heat conductive material forms an outer surface of the coated flexible open-cell polyurethane foam that is co-planar with the first major surface of the flexible open-cell polyurethane foam.

11. The structure of claim 1, wherein the flexible heat conductive material is encapsulated in a polymeric membrane.

12. The structure of claim 1, wherein the flexible open-cell polyurethane foam is a viscoelastic polyurethane foam.

13. The structure of claim 1, wherein the flexible heat conductive material covers 50 percent (cov. expressed in %) of the surface area of the first major surface of the flexible open-cell polyurethane foam, the total surface area of the gaps provides 50 percent of the surface area of the first major surface of the flexible open-cell polyurethane foam and the gap width of each gap is 6.4 to 9.0 mm in width.

14. The structure of claim 1, wherein the total number of the gaps is 23 to 35.

* * * * *